United States Patent
Shaw et al.

[11] Patent Number: 5,867,712
[45] Date of Patent: Feb. 2, 1999

[54] SINGLE CHIP INTEGRATED CIRCUIT SYSTEM ARCHITECTURE FOR DOCUMENT INSTRUCTION SET COMPUTING

[76] Inventors: Venson M. Shaw; Steven M. Shaw, both of 111 Reldyes Ave., Leonia, N.J. 07605

[21] Appl. No.: 985,520

[22] Filed: Dec. 5, 1997

Related U.S. Application Data

[62] Division of Ser. No. 781,213, Jan. 10, 1997, which is a division of Ser. No. 43,625, Apr. 5, 1993, Pat. No. 5,600,844.

[51] Int. Cl.$^6$ .................................................. G06F 9/45
[52] U.S. Cl. .......................................................... 395/704
[58] Field of Search ...................................... 395/701, 702, 395/703, 704, 705, 706, 707, 708, 709

Primary Examiner—James P. Trammell
Assistant Examiner—Peter J. Corcoran, III

[57] ABSTRACT

An improved system utility using pointers and stacks and a method for high level language procedure for representing, storing, retrieving, processing, and/or manipulating documents, said system utilities facilitates compilation, linkage, processing, and management of said high level language procedures. Call, return, and auxiliary stacks are included to store pointers of normal, exceptional/conditional, and alternative operations. A bit mapping logic and smart object memory are used to look ahead, monitor, and predict forthcoming exceptional/conditional operation, a system look-up table further prefetch relevant procedural and data pointers for maintaining pipeline coherence.

90 Claims, 5 Drawing Sheets

SINGLE CHIP INTEGRATED CIRCUIT SYSTEM ARCHITECTURE FOR DOCUMENT INSTRUCTION SET COMPUTING

This application is a divisional of copending application (s) application Ser. No. 08/781,213 filed on Jan. 10, 1997 which is a divisional application of Ser. No. 08/043,625 filed on Apr. 5, 1993 now U.S. Pat. No. 5,600,844.

FIELD OF THE INVENTION

The present invention is related to integrated circuit system technologies according to a novel Document-Instruction-Set-Computing (DISC) principle. More specifically, the present invention not merely defines the core functions for a baseline DISC single chip integrated circuit, it equally set sufficient evolution guidelines for future generations of scalable DISC microprocessors capable of wide range of real-time performance. In particular, these novel DISC microprocessors can effectively perform distributed document storage, processing and retrieval operations for systems, services, and applications including, but not limited to, personal communication systems, interactive database retrieval, HDTV, object-oriented systems and functions, and multimedia computing devices.

BACKGROUND OF THE INVENTION

Digital signal coding, storage, retrieval, control, and processing of document data types in real-time represents the most time-critical functional component for many of the emerging computing, communication, and storage systems or devices. For almost all of the document signal processing technologies which being developed to date, single or plurality of host processors or coprocessors means, in conjunction with additional hardware, firmware, or software means, are proposed according to the existing complex-instruction-set-computing (CISC) or reduced-instruction-set-computing (RISC) principles.

These CISC or RISC host processing or coprocessing techniques can partially improve the performance of specific data subsystems, such as encoding multiple algorithms, managing memory or display devices, and adapting to existing DOS, OS2, WINDOW, NT, or UNIX application and system environments. Typically, they can be readily implemented either in hardware, firmware, or software means embedded with custom integrated circuit, digital signal processor, or application specific integrated circuit (ASIC's). Though practical, the speed and performance of these technologies are severely limited by the overall system throughput, and the run-time architectural supports for processing; networking; program control; and memory management imposed by the CISC and RISC data computing principles.

Since CISC and RISC technologies have primarily invented to optimize the run-time data computation performance for fixed or floating point data operations, run-time procedure and data are typically coded, stored and retrieved in specific file format from local or remote disk storage. Therefore, CISC and RISC computing devices becomes insufficient to meet real-time performance when it is required to interactively manipulate, retrieve, and process variable-size document data types, and to provide direct real-time architectural support for distributed processing and database programming environment. For example, please refer to U.S. Pat. No. 5,056,154 to Aono, U.S. Pat. No. 5,047,953 to smallwood, U.S. Pat. No. 5,010,495 to Willetts, and U.S. Pat. No. 4,899,148 to Sato.

While the aforesaid patents teach individual method and apparatus for compressing and decompressing the binary document image data, improving the document data frame memory subsystem performance, and enhancing the visual quality for display or printout of the decompressed document image, none of aforesaid patents have ever directed themselves to the concept and structure of a novel method and apparatus for more generalized computing platform which would interconnect all the data processing machines for enterprise, consumer, and communications, and allow individuals to create, augment, select, interpret, retrieve, update, and present multiple forms of compound document data, including annotated descriptions of sound, image, graphics, and live video sequence in a coherent and effective system architecture which would automatically adjust to each individually available processor and memory bandwidth, capable of communicating in multiple bandwidths to traverse through wide ranges of networks, prioritize each individual complex document data types, and allow for optimum performance for complex document data interpretation and processing.

More significantly, although all these prior arts have shown CISC and RISC can be extremely suitable for traditional computation-intensive application and programming environments. None of the aforesaid patents have directed themselves to the concept and structure of broadening the scope, and to develop a new computing facility. This new computing platform can not only interconnect the regular computers and workstations, but it can also interconnect many other desktop data equipment, including but not limit to, copy machines, scanners, fax machines, printers, televisions, camcorders, telephones, VCR's, CD players, cameras, sensors, or any other consumer and personal communication devices in a totally integrated system and database environment. Consequently, in this novel integrated computing environment, complex document data manipulation, storage, and retrieval gain the highest priority, and achieve the best performance as comparing to traditional data computation tasks, and regular computers and workstations would become a subset of this novel distributed computing platform.

DISC architecture offers a totally new distributed computing platform. Distinguish from all the prior arts which have adapted the traditional CISC or RISC computing discipline, DISC provides new methods and apparatus to organize a plurality of complex document data types, DISC also streamline, optimize and preschedule the document instruction clusters, and provide parallel or pipeline execution for these instructions. DISC further provide hardware architectural supports to efficiently execute high-level programming and database language constructs, and to facilitate CISC or RISC application coprocessor for traditional DOS or UNIX applications. Finally, DISC provide distributed object-oriented operating-system interface to support supplemental execution of traditional DOS or UNIX application tasks with the real time DISC document signal processing.

OBJECTS OF THE INVENTION

Accordingly several objects and advantages of my invention are:

An object of the present invention is to define an integrated document computing architecture which can accommodate communications, storage, and retrieval, of all digitally-coded or algorithmic complex document data types.

Another object of the invention is to provide a novel integrated system architecture which is flexible and allows the control and communications among copy machines, scanners, fax machines, printers, camcorders, televisions, telephones, VCR's, CD players, cameras, sensors, or any other consumer and personal communications data processors, as well as desktop data processors such as computers and workstations.

A still further object of the present invention is to provide for a novel process architecture which allows for direct hardware support in compression, bandwidth management, program control, instruction streamlining and prescheduling, parallel or pipeline execution, run-time memory and database management, decompression, display and printout, and other time-critical functions for manipulation, storage, and retrieval of complex document data objects in high-level programming and database language architecture.

A still further object of the present invention is to provide for a novel process architecture which not only allows for digital coding techniques, but also can interface with traditional analog storage or transmission techniques.

A still further object of the present invention is to provide for a novel process architecture which allows the human users to interface with application program and database, and to select the appropriate document data types media combination either before or during the communication session.

A still further object of the present invention is to provide for a novel process architecture which not only allows for the most optimized system performance for complex document data types, but also can directly execute traditional computation-intensive application programs using a CISC or RISC application coprocessor.

A still further object of the present invention is to provide for a novel process architecture which allows for an optimized operating system for complex document data types, and accommodate traditional UNIX, DOS, or other traditional desktop operating systems.

Further objects and advantages of the present invention will become apparent from a consideration of the drawings and ensuing description of it.

SUMMARY OF THE INVENTION

Our present invention, DISC (Document-Instruction-Set-Computing) architecture, offers new computing discipline optimized for real time data manipulation and interpretation for compound document related applications. This is totally distinguished from all prior arts which have adapted the traditional CISC or RISC architectural discipline, which are best optimized for real time data computation. DISC provides new methods and apparatus to organize, store, retrieve, update, and present a plurality of compound document data types. DISC also streamline, optimize, and preschedule these document instruction clusters, and provide parallel or pipeline execution for these instructions. DISC further provides hardware supports for run-time memory and database management, program control, preprocessing and post processing, compression and decompression. DISC can directly query document data from either memory, file, or databases. DISC further sport CISC or RISC application coprocessor to perform traditional DOS or UNIX or alike applications. Finally, DISC provides object-oriented operation system and database interface which can provide concurrent execution of DISC, DOS and UNIX operations.

FIG. 2A and 2B show the architectural principle of DISC. Contrary to a traditional RISC or CISC architecture, the data processors and memory system are completely optimized to facilitate variable sized block oriented data instead of the traditional bit-oriented data streams. To be more specific, data information are organized according to selective internally reconfigurable block format, wherein these internal format can accommodate various processor configurations as well as data throughput. A scalable smart memory system architecture and memory management unit also provides the programmable data block addressing, frame memory management, and associative block search.

In addition, DISC instruction sets can be statically compiled into a set of system look-up tables (SLUT's). Based upon the run time bandwidth constraints caused by either network congestion or application request, the DISC instruction processor can prefetch a group of such DISC instructions, and designate them with various functional units for parallel or pipeline execution. Comparing to the more traditional cache or virtual memory techniques widely used in the existing RISC or CISC computers, the SLUT technique employs intelligent fast associative search scheme, and is able to simultaneously perform prescheduling, compilation, linking, assembling, dereferencing, and issuing instructions for run-time execution, program control, and memory or database management functions.

In a DISC architecture, a scalable smart memory system is connected to the functional units and scalable formatter, which can access, store, and transfer blocks of document data based on the selective internal format.

In FIG. 3, DISC architecture also illustrate an embedded RISC or CISC co-processor element in order to directly execute the bit oriented application programs in DOS, Window, NT, Macintosh, OS2, UNIX, or alike. In a more preferred embodiment, DISC can include a real time object oriented operation system wherein concurrent execution of the application program and real time DISC based document computing can be performed.

DISC architecture provides a single computing platform to support a plurality of supplemental document data types including but not limited to, live motion video, voice, music, still image, and animated graphics. Consequently, it becomes feasible to digitally integrate copy machine, scanner, fax machine, printers, slide projectors, camcorders, television, computers, cameras, telephones, answering machines, and alike, with human users and traditional application program.

DETAILED DESCRIPTION OF THE PREFERRED EMBODIMENT

1. GENERAL DISCUSSION

Figure 1:
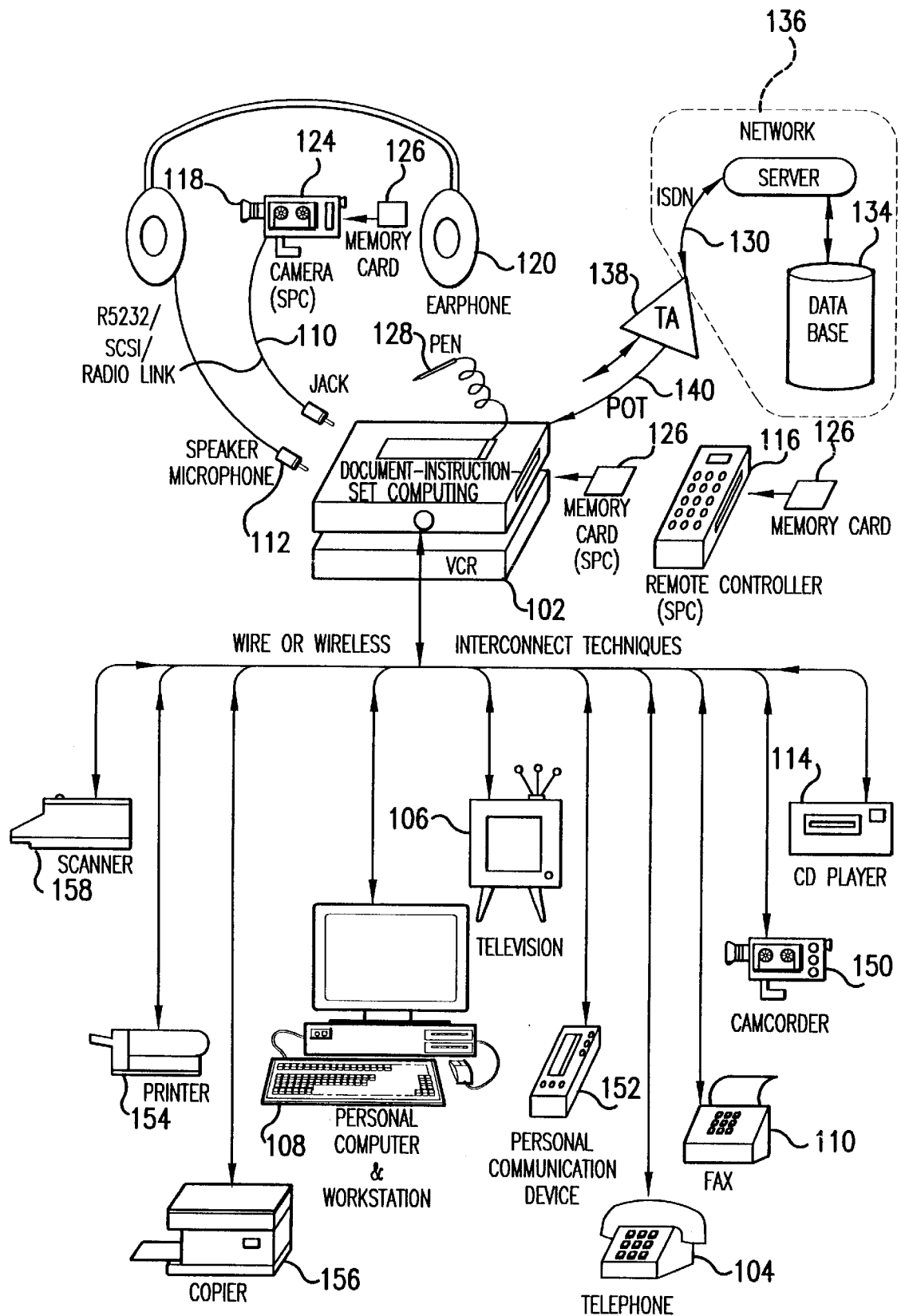
FIG. 1 shows the pictorial illustration of a typical document instruction set computing (DISC) environment.

Referring now to the drawings wherein like reference numerals refers to similar or identical parts throughout the several views, and more specifically to FIG. 1 thereof, there is shown a pictorial representation of a novel integrated circuit DISC (document instruction set computing) system apparatus. There is also shown a pictorial illustration depicting most of the popular business or consumer electronic apparatus relating to computer, communications, and entertainment presently available for the homes or offices. These include a copier, printer, scanner, fax machine, telephone, camcorder, CD player, television, personal computer, and personal communications devices.

It is Applicant's intention to disclose a unified system method towards integrated circuit design of all future interactive document-oriented personal communications and/or computing systems.

It is also Applicant's intention to illustrate the architecture design of a DISC apparatus according to this unified system design method.

Furthermore, the DISC system apparatus allows for compatibility with all existing business and consumer electronic apparatus. DISC user/operator can control, and utilize the functions of each electronic apparatus by means of the DISC system apparatus. The DISC apparatus, being of compact size and shape, similar to that of a VCR, desktop or notebook PC, remote controller, or smaller, can interconnect with all local or remote electronic apparatus, and permit them to function complimentary with each other.

It is yet another Applicant's intention to further substantiate a distributed system architecture for DISC, in which a plurality of DISC's can either locally or remotely communicate with each other and other non-DISC apparatus. Regardless of whether other apparatus were analog, digital, hardware, software, or algorithm, the DISC's can encode, forward, decode, and interpret automatically to the available bandwidth, in a totally integrated system environment.

It is beyond the scope of the present invention to detail all the exact nature and coordination of the system, but details of these operations have been previously disclosed on a copending application, entitled "Methods and Apparatus including System Architecture for Multimedia Communications", filed Sep. 20, 1991, Ser. No. 07/763,451.

2. GENERAL INTRODUCTION OF DISC

Figure 2A:
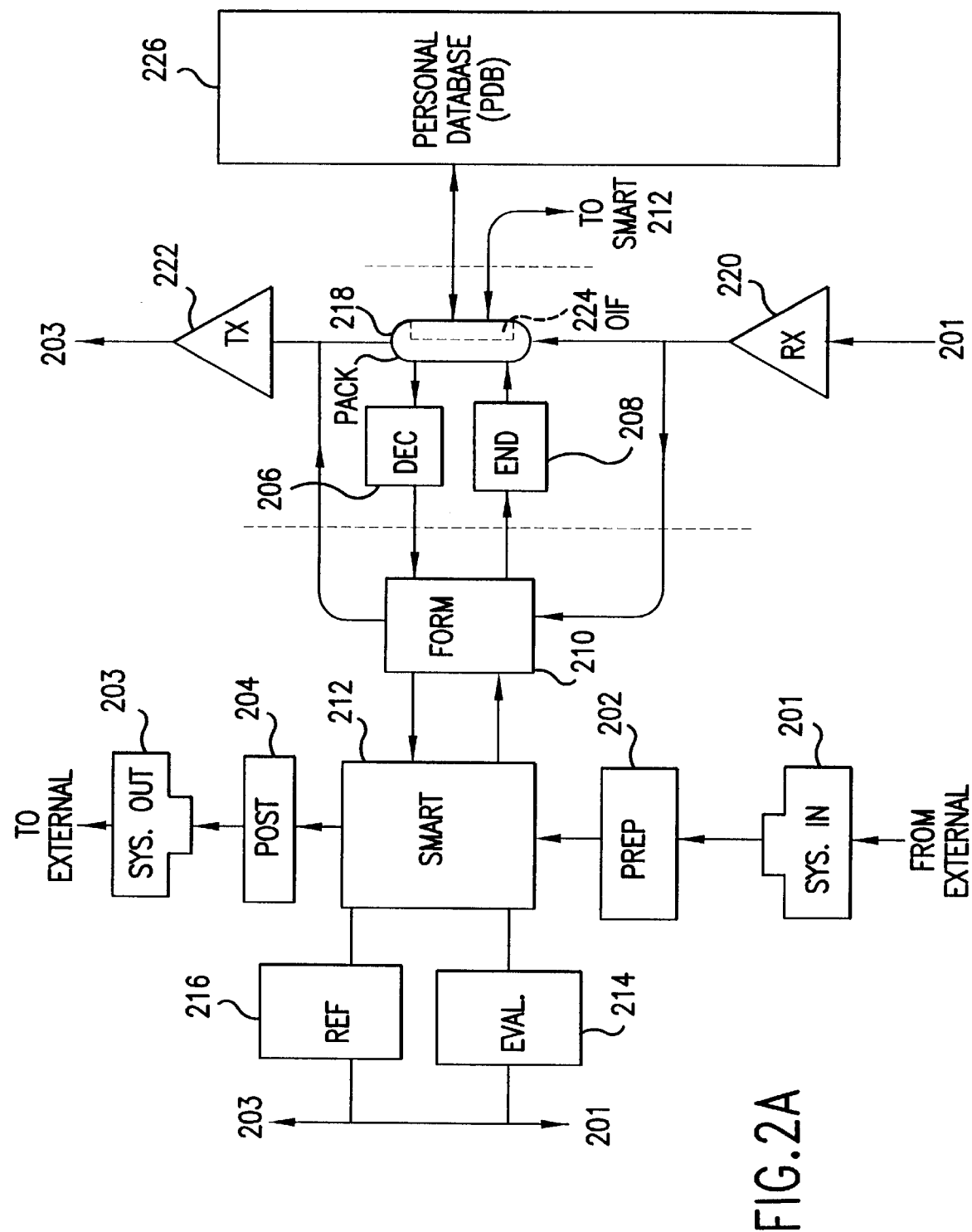
FIG. 2A and FIG. 2B show the core DISC integrated circuit system architecture in accordance with the present invention.
Figure 2B:
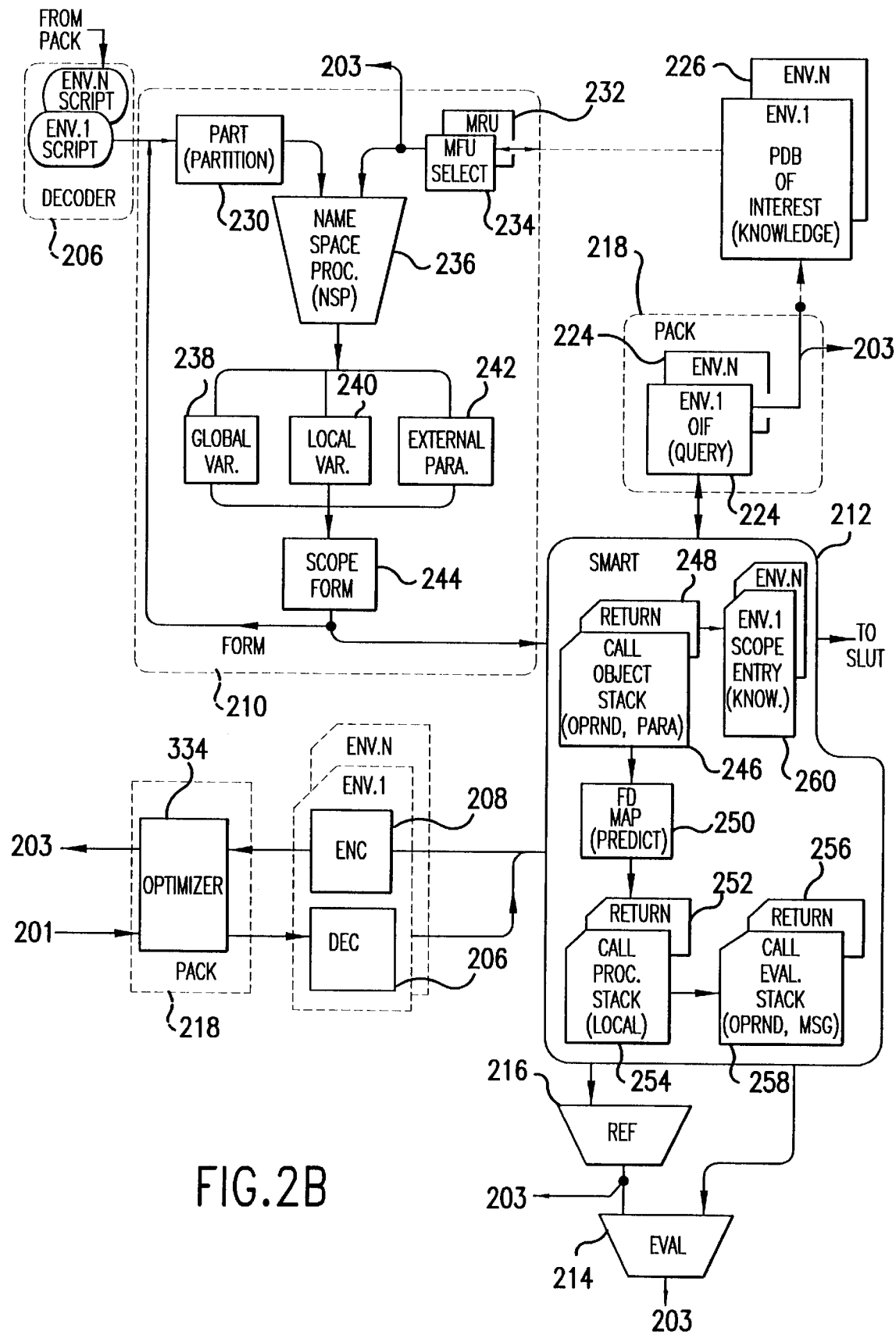

FIG. 2A and FIG. 2B illustrates the core architecture, operation, and methodology for the design and implementation of a DISC 112 integrated circuit computer and communications system.

DISC 112 makes it possible to retrieve, interpret, substantiate, correspond, and maintain a multitude of compound document objects over a wide range of communications networks.

Prior arts in accordance with traditional RISC or CISC methodologies have shown plentiful methods and apparatus to improve individual or selective group of computation tasks such as document compression and decompression algorithms, and bandwidth operability for selective communications networks. However, cost performance for document database and processing applications can be dramatically improved, provided systems have internal ability to retain the initial document request and subject of interest, then accurately search through all possible reference resources and analyze and identify the most suitable target material, finally authorize specific procedural and/or instruction steps for each document request.

As a result, the methodology for DISC 112 becomes intrinsically different. RISC or CISC's primary focus are to optimize run-time computation performance, i.e., instruction authorization, decoding, pipelining, arithmetic and logical execution, and memory control and management. DISC 112 requires and provides additional real time performance for query, reasoning, compilation, decoding, and interpretation of the incoming data streams prior to any instruction authorization or document execution. Comparatively, the RISC and CISC can offer superior performance for numerical intensive data computation applications, wherein DISC 112 is specifically optimized for document retrieval and subsequent procedural authorizations.

Furthermore, prior arts in CISC and RISC only rely on traditional OCR (optical character recognition) techniques to compute, analyze, and recognize characters strings according to individual shapes and contours, whereby DISC 112 allows for 100% recognition for incoming document data through front-end data decoding subsystem and techniques. As a result, the incoming data streams are decoded to selective internal DISC 112 optimized data format, which including but not limit to the 8 or 16 bit universal character encoding forms.

Finally, DISC 112 focus on performance optimization other than the traditional RISC/CISC run-time data computation, DISC 112 subsystems include but not limit to, document identification, manipulation, compilation, encoding and decoding, interpretation, storage and retrieval. Subsequently, all DISC 112 instruction groups are issued and executed to facilitate run-time document manipulation, and to conform specific application, networking, and user priority requests.

The diagrammatic representation illustrated in FIG. 2A comprises the following major system components. They are a personal database (PDB 226), a packet processor (PACK 228) a transmission processor (TX 222), a receiving processor (RX 220), a decoding processor (DEC 206), a encoding processor (ENC 208), a formatting processor (FORM 210), a smart memory (SMART 212), a reference processor (REF 216), a evaluation processor (EVAL 214), a preprocessor (PREP), a postprocessor (POST), a bandwidth controller (BAND 228), and a system controller (CON 230).

A. Personal Database (PDB)

In a preferred embodiment, the PDB 226 (personal database) integrated circuit is able to provide an optimized memory storage and management subsystem in order to accumulate, manipulate, store, and retrieve a single or plurality quantities of personal knowledge content corresponding to the selective DISC 112 internal data format signal it receives from PACK 218 (packet processor).

The PDB 226 integrated circuit is comprised of a single or plurality of storage array that is comprised of a single or plurality of memory storage cells. The PDB 226 is also comprised of the sensing, control, management, and interface circuits connected locally and/or remotely to a single or plurality of said storage array which transceiver store, and manipulate single or plurality quantities of said personal knowledge content that is comprised of compound document objects corresponding to said selective DISC 112 internally optimized data format signal. There is also a computation circuit which, when activated, produces logical pointer signal, storage address signal, and/or attribute identifier signal for incoming and/or outgoing said personal knowledge content. The PDB 226 is further comprised of the buffer, register, and/or stack elements which can store and select said logical pointer, storage address and/or attribute identifier signal to manipulate, prioritize, and retrieve selective said incoming and/or outgoing personal knowledge content. In addition, The PDB 226 is further comprised of the buffer, control, and interface circuit connected locally and/or remotely to a single or plurality of PACK 218 (packet processor) integrated circuit which transceive said personal knowledge content that is comprised of selective said logical pointer, storage address signal, attribute identifier signal, compound document object, and/or corresponding DISC 112 internal data format signal.

In a more preferred embodiment, as shown in FIG. 2B, the PDB 226 (personal database) integrated circuit connected to the OIF 224 (object interface) integrated circuit is further comprised of buffer, control and interface circuits which segregate, partition, and assign individual knowledge content to single or plurality of personal application environments. There is also buffer, control and management circuits which receive and update input request signal, run-time attribute signal, and/or priority signal either locally or remotely from a single or plurality of application, user, and/or communications network.

B. Packet Processor (PACK)

In a preferred embodiment, the PACK 218 (packet processor) integrated circuit is able to transcode and interpret DISC 112 compound document control signals corresponding to selective standard or proprietary protocols for communications, operating systems, text description, database access and/or database management. PACK 218 can also store, relay, translate DISC 112 compound document data signal into single or plurality of frames, packets, cells, or macroblocks corresponding to said standard or proprietary protocols for inbound or outbound communications. Preferably, the PACK 218 is further able to either locally or remotely communicate with external PACK 218's and to perform point-to-point and point-to-multipoint networking sessions, and to interpret and control single or plurality layered signalling data structure.

The PACK 218 is comprised of a single or plurality of protocol controller and data processor connected to the ENC 208 (encoding processor) and TX 222 (transmission processor) integrated circuit which receive an encoded DISC 112 control and data signals from ENC 208 and produce outbound data, control, and maintenance packets, frames, cells, or alike to TX 222 corresponding to selective standard or proprietary protocols for communications, operating systems, text description, database access, and database management which, when activated, including but not limit to, PDL, SQL, Netware, NT, OS2, DOS, UNIX, Q.931, X.25, G3, G4, GSM, CIF, QCIF, SIF, ATM (asynchronous transmission mode) or alike. Said protocol controller and data processor also connected to the DEC 206 (decoding processor) and RX 220 (receiving processor) integrated circuits which receives inbound packet, frames, cells, or macroblocks from RX 220 corresponding to said selective protocols and produce DISC 112 control and data signals to DEC 206 for decoding. There is also a buffer element connected to the TX 222 and RX 220 which transmit and receive document control, maintenance, and data packet, frames, or cells. The PACK 218 is further comprised of a interface, buffer and control circuits connected to FORM 210 and PDB 226 integrated circuit which, when activated, receive DISC 112 internal reformatted document signals from FORM 210 and enable said buffer circuit to transfer and store said reformatted signal into PDB 226. Reversely, said pipeline buffer element further retrieve the internally formatted DISC 112 signal from PDB 226 and translate to said selective protocol formatted packets, cells, frames, or macroblocks for outbound communication.

In a more preferred embodiment, said protocol controller is further comprised of controller element connected via TX 222 and RX 220 to a single or plurality of local or remote external PACK's which establish, maintain, and terminate point-to-point and point-to-multipoint distributed networking sessions, said controller is further comprised of buffer, control and management circuits connected to OIF 224 integrated circuit, as shown in FIG. 2B, which compute input request signal, run-time attribute signal, and/or priority signal either locally or remotely for a single or plurality of application, user, and/or communications network.

In a further preferred embodiment, said protocol control processor element is comprised of a signalling control circuit which transceive a single or plurality of layered signalling data structure corresponding to selective OSI, SS7, TC/PIP or alike, and receives, interpret, or produces a single or plurality of user preference signal, application requirement signal, session control signal, transmission set-up signal, network control signal, logical or physical link setup and termination signal, and/or the alike and translate said signals into corresponding sequence of internal DISC 112 executable procedures or routines.

C. Transmission (TX) and Receiving (RX) Processor

In a preferred embodiment, the TX 222 (transmission processor) and RX 220 (receiving processor) integrated circuit are able to transceive document signal corresponding to a single or plurality of application requirements, networking environments, user priority requests, and run-time bandwidth conditions.

The TX 222 and RX 220 are comprised of a single or plurality pairs of transceivers which, when activated, correspond to a plurality of analog or digital networks which, including but not limited to: ATM, SONET, broadband ISDN, FDDI, MAN, DS3, twisted-pair LAN., coaxial LAN, switch T1, dedicated T1, primary rate ISDN, fractional T1, frame relay, ISDN switched H1, single or dual channel basic rate ISDN, digital switched or private PSDN, analog twist-pair, basic rate ISDN D channel, and wireless communications. The TX 222 and RX 220 are also comprised of sensitizing circuit connected to the PACK 218 integrated circuit which sensitizes run-time networking conditions and produce selective run-time bandwidth allowance signal which, correspond but not limited to: 150 Mbs, 100 Mbs, 45 Mbs, 10 Mbs, 2.048 Mbs, 1.544 Mbs, 384 Mbs, 128 Mbs, 64 Kbs, Px 64 Kbs, 56 Kbs, 19.2 Kbs, and/or 9.6 Kbs.

In a more preferred embodiment, the TX 222 and RX 220 are further comprised of interface and transceiver circuit connected to the OIF 224 via PACK 218 which transmit and receives input request signal, run-time attribute signal, and/or priority signal either locally or remotely for a single or plurality of applications, users, and/or communications network.

D. Decoding (DEC) and Encoding (ENC) Processor

In a preferred embodiment, the ENC 208 (encoding processor) and the DEC 206 (decoding processor) integrated circuit are able to locally and/or remotely encode and decode the compiled high level language procedural modules corresponding to a single or plurality of selective procedural coding algorithms for direct interpretation, execution and manipulation of the source document content. The DEC 206 and the ENC 208 integrated circuit are also able to locally and/or remotely decode DISC 112 data tokens and encode DISC 112 data signal respectively corresponding to a single or plurality of selective compound document data coding algorithms. Preferably, said DEC 206 and ENC 208 can also select said data and/or procedural coding algorithm employing appropriate mechanisms to meet system performance. More preferably, said DEC 206 and ENC 208 are further able to internally or externally communicate, interface, and perform with single or plurality of software or hardware coprocessor modules.

The DEC 206 is comprised of a single or plurality of time, pel, and/or frequency domain data decoding circuits connected to PREP 202 and PACK 218 which, when activated, receive local or remote encoded tokens and/or bit-map corresponding to a single or plurality of selective text processor, printer 154, graphic display, fax 110, scanner 158, or copier 156 data format, and convert, transform, and produce source document signal corresponding to selective DISC 112 internal data format. Said DEC 206's data decoding circuits is also comprised of interface, control, and buffer circuit connected to FORM 210 which, when activated, transfer to FORM 210 said source document corresponding to selective DISC 112 internal data format for further analysis and evaluation. The ENC 208 is comprised of a single or plurality of high level language procedural encoding circuits connected to SMART 212 which, when activated, receive high level language procedures corresponding to selective source document from SMART 212 and produce direct executable DISC 112 encoded procedures corresponding to single or plurality of procedural coding algorithms. Said ENC's procedural encoding circuit is also comprised of interface, control, and buffer circuit connected to PACK 218 and REF 216 and EVAL 214 which, when activated, transfer said direct executable DISC 112 encoded procedures for remote and/or local interpretation, manipulation, and operation of said source document. Said DEC 206 and ENC 208 are further comprised of pipeline buffer and processing circuit connected to POST 204 and PREP 202 which, when activated, respectively produce and receive compatible output and input signal for single or plurality of computer 108, communications, and entertainment equipment, which include, but not limit to, copier 156, printer 154, scanner, fax 110 machine, telephone 104, camcorder, CD player, television 106, personal computer 108, and personal communications devices.

In a more preferred embodiment, as shown in FIG. 2B, said ENC's and DEC 206's procedural encoding and decoding circuits are further comprised of application/task queuing circuit connected to SMART 212 and CON 230 integrated circuit which, when activated, look-ahead fetch and retrieve selective group of precompiled and directly executable procedural to selectively control and manipulate said compound document in a single or plurality of application environment. Said DEC 206 and ENC 208 are further comprised of a single or plurality of time, pel, and/or frequency domain data decoding and encoding circuits connected to PACK 218 which, when activated, retrieve and produce respective decoded DISC 112 signal and encoded DISC 112 tokens correspond to a single or plurality of time, pel, and/or frequency domain coding algorithms, and for a single or plurality of compound document data types which, including but not limit to text, ASCII data, audio, image, graphics, and video. Said ENC's and DEC's procedural and data processing circuits are further comprised of a pipeline buffer circuit connected to SMART 212 and PACK 218, which when activated, either receive encoded tokens from SMART 212 or PACK 218 for decoding, transfer decoded or encoded signals and procedures to SMART 212 for local storage, or relay decoded and encoded document to PACK 218 for remote application.

In a further preferable embodiment, The DEC 206 and ENC 208 are further comprised of interface circuit connected to CON 230 which, when activated, internally or externally pipeline, cascade, or parallelize a single or plurality of hardware or software coprocessor modules and decode and encode selective algorithm at selective subline, line, group of lines, area of interest, block, macroblock, group of block, partial frame, whole frame, or group of frame image level to meet system performance.

E. Formatting Processor (FORM)

The FORM 210 (formatting processor) integrated circuit is able to retrieve single or plurality set of source documents, query PDB's personal knowledge content, and search through and locate said document's potential area of interest. In addition, the FORM 210 is also able to retrieve PACK's run-time attribute signals of said input document, static and/or dynamically compute the communication, processing, and storage bandwidth requirement and allowance signal, and establish selective DISC 112 internal signal format corresponding to available run-time processing capabilities. Preferably, the FORM 210 is further able to receive, schedule, and optimize a single or plurality of high level language and database query procedures from SMART 212 integrated circuit corresponding to said document's area of interest.

As shown in FIG. 2B, the FORM 210 is comprised of input receiving circuits connected to DEC 206 which receive a single or plurality of fully decoded document scripts and/or their reference pointers, wherein said document script correspond to selective internal DISC 112 format and allow for 100% text recognition and achieve significant content compression and representation. Said input receiving circuit is further comprised of partitioning circuit (PART 230) which parse and organize said document into entities comprising of a single or plurality of sentence, paragraph, page, chapter, or other physical or logical segmentation means. There are also database query input (SELECT) circuit connected to PDB 226 which receive personal knowledge content correspond to selective most-frequently-used (MFU) or most-recently-used (MRU) algorithms.

In addition, the FORM 210 is comprised of a name space processor (NSP 236) which is further comprised of input circuit connected to PART 230 (text partitioning) circuit which, when activated, receive said segmented document. Said NSP's input circuit further connected to said SELECT (database query) circuit which, when activated, receive selective area of PDB's knowledge content. Said NSP 236 is further comprised of a single or plurality of iteration and/or parallel processor means which compare, locate, and produce selective area of interest for each segmented document script. Said NSP 236 processor means further establish a scope content for each script which comprising a single or plurality of global and local variables and parameter set, wherein said global variables correspond to common subject of personal interest, said local variable correspond to particular subject of interest for specific application environment, and said parameter set correspond to the selective run-time referencing and communication pointers between segmented scripts. There is also a scope controller (SCOPE 244) circuit connected to NSP 236 which, when activated, formulate and buffer said scope content for each corresponding segmented script. Said SCOPE 244 (scope controller) circuit is further comprised of loop-back circuit which, when activated, transfer said scope content to said PART 230 (partition) circuit and further parse said segmented script.

The FORM 210 is further comprised of a processor element connected to the PACK 218, which when activated, receive run-time bandwidth attribute signals corresponding to selective application, networking, and execution environment and produce processing and storage bandwidth requirement and allowance signal, said processor element further produce selective DISC 112 internal signal format corresponding to available run-time processing capabilities.

In a more preferred embodiment, there is also interpolating and extrapolating processor circuit connected to the PACK 218 which, when activated, receive run-time attribute signals corresponding to a local or remote differential compound document and corresponding motion vector for its video script, and static look-up, formulate, and produce internal data structure corresponding to pre-assigned system clock and SLUT 232 parameters. The FORM 210 is further comprised of a dynamic program scheduler and optimizer circuit connected to PACK 218 which, when activated, receive run-time alert signal and further reformat said signals corresponding to run-time user, application, and networking conditions. There is further a prescheduler circuit connected to the ENC 208 and DEC 206 integrated circuit which optimize, partition, and produce a coherent procedure flow for the selective sequential, pipeline, or parallel encoding and decoding of said document signal.

In a further preferable embodiment, the FORM 210 is further comprised of a scaling circuit connected to the SMART 212 (smart memory) integrated circuit, which invoke system calls and dynamically adjust system clock rate, aspect ratio, and SLUT 232 parameters to provide a linearly scalable DISC 112 system performance. There is also a scheduler and optimizer circuit connected to SMART 212 which when activated, statically and/or dynamically receive, schedule and optimize a single or plurality of high level language and database query procedures from SMART 212 and partition them into a single or plurality of program control signaling modules corresponding to sequential, pipeline, and/or parallel encoding and decoding of said document signal.

F. Smart Memory (SMART)

In a preferred embodiment, as shown in FIG. 2B, the SMART 212 integrated circuit is able to establish a single or plurality of independently compiled high level language procedures modules, wherein each module represent the query, manipulation, and retrieval of a single or plurality of segmented script located within the source document, each script further correspond to a single or plurality of subject of interest specified by the user, application, and/or network. The SMART 212 can also allow a single or plurality of human, computer 108, and/or machine to specify said subject of interest, and to accommodate changes of run-time environment for selective user, application, and networking conditions, it further allow for sequential or parallel access, manipulation, and processing of said compiled procedural modules.

The SMART 212 is comprised of a single or plurality of object stack (OSTACK) connected to the FORM's scope controller (SCOPE 244) circuit which, when activated, receive a single or plurality hierarchy of scope content signal corresponding to selective subject of interest at each level and further selective detailed subject of interest at the subsequent level, said OSTACK is also comprised of input interface circuit connected to OIF 224 circuit which, when activated, receive selective recommendation from application, user, and/or network and further produce a single or plurality list of subject pointer signals that is further comprised of level index field, subject index field, and identifier field, wherein said level index field correspond to the selected number of hierarchy level, said subject index field correspond to the selected number within said level of hierarchy, and said identifier field connected to a decoder further correspond to the coded name of the selected subject of interest.

Said OSTACK is further comprised of storage, control, and pipeline buffer means, wherein said storage means is comprised of a single or plurality of register, memory and/or storage array for storing said list of selected subject pointer signals, said controller means is further comprised of program counter logic and data register means wherein program counter logic calculate the pointer address within said list for the next cycle's top of stack (TOS) pointer location, data register means retrieve and store the next cycle's TOS pointer data content. In a more preferred embodiment, a pipeline buffer means connected to system controller (CON 230) integrated circuit is further included which, when activated, additionally store a single or plurality of selective TOS address and data content for the present and a plurality of past and future operation cycles, which cooperate with CON 230 to perform scheduling, planning, and pipeline control. There is also next script pointer and controller which, when activated, produce a single or plurality chain of pointers that is further comprised of the entry location, descriptor and/or attributes of the next segmented document script for the next selected subject of interest.

There is also a next environment pointer (NEXT) circuit which, when activated, produce a single or plurality chain of pointer descriptors for the next cycle of execution environment and provide mapping of selective run-time environment for said user, application, and/or network to selective area of interest. The NEXT (next environment pointer) is comprised of subject field, attribute field, script field, and status field, wherein said subject field correspond to the next selected subject retrieve from the OSTACK's list of interest, said attribute field correspond to the current run-time environment signal which it received from CON 230 for presume and continue the current network, user, and application conditions, said script field correspond to the next segmented script which further correspond with the next selected subject of interest, and said status field is further comprised of next cycle environment call type, previous environment call type, next subject data type, and masking and control sub-fields, wherein environment call type identify whether the previous and next cycle of run-time execution require to invoke and enter into another internal or external calling procedure, to return and exit from the present called procedure, or to simply remain within the same procedure and perform further operation. Furthermore, the data type identify whether the next subject of interest is a global variable, a local variable, a parameter, or a label. Finally, the masking and control sub-field determine whether the next subject is executable or not.

The SMART 212 is further comprised of scope entry logic (ENTRY) circuit connected to OSTACK and OIF 224 which, when activated, receive from OIF 224 the input direction for selective user, application, and/or network and construct a single or plurality of knowledge representation which is further comprised of state machine, flow chart, chain, graph, table, or other equivalent representations for user, machine, and/or application to assign scope boundary for each segmented script and to access and utilize the corresponding subject of interest. Said ENTRY circuit is further comprised of buffer element which sequentially or parallelly store said corresponding knowledge representation path for said scope content signal. In addition, said ENTRY is further comprised of circuit which produce a single or plurality of chain of reference pointers and allow single or plurality of run-time environment including user, application, and/or network to select specific knowledge path and to browse through the corresponding document scripts.

More preferably, said ENTRY is further comprised of run-time attribute pointer and control circuit which, when activated, produce a single or plurality of chain of attribute pointers which provide alternative mapping of said user, application, and/or network to a single or plurality of document script and corresponding area of interest and accommodate on-line run-time environment changes including application request, user priority, and/or network bandwidth shortage.

In addition, the SMART 212 is comprised of frame differential bit maps (FDMAP 250) circuit that is further comprised of a single or plurality of subject map signal, script map signal, status field, and frame difference control field, said subject map signal is comprised of the horizontal and vertical coordinates of the selected subject of interest, said horizontal coordinate represent the selected level within the hierarchy of interest and said vertical coordinate represent the select subject index within that level. Said script map signal is comprised of coordinate pair for the two dimensional row and column representation of the corresponding segmented script, wherein each horizontal coordinate is assigned to a independently compiled external procedure, each corresponding vertical coordinate is further assigned to any of its internal procedures. There is also a pointer control circuit which logically interconnect multiple rows and/or column in order to allow nested internal and external procedural calls among each other. Said Status field further indicate said FDMAP 250 is for a selected present, previous, or future operation cycle. Said frame difference control field is further comprised of a single or plurality of status, program-flow control, and memory management of said procedure and its segmented document script for selective run-time environment.

Said FDMAP 250 is further comprised of a PREDICT circuit connected to CON 230 integrated circuit which compare multiple frames of said FDMAP 250, identify frame differential information, predict run time environmental changes, and acknowledge and make recommendations to CON 230 to avoid pipeline break.

The SMART 212 is further comprised of program control means connected to PREDICT which is comprised of a single or plurality of procedure call (PCALL) stack and procedure return (PRETURN) stack. Said PCALL stack is comprised of procedural control means which receive grant signal from PREDICT and prepare ahead of time a plurality of forthcoming program control steps and activation record according to a regular plan-ahead procedure control mechanism, said PRETURN stack is comprised of procedural control means for all the exception situations which receive PREDICT's control alert signal that next operation cycle require the activation and access of a previous activation record environment. Said PRETURN then prepare ahead of time and fetch the selected previous activation record from PRETURN stack and prepare special procedural control instruction accordingly.

The SMART 212 is further comprised of operator and message control means connected to PREDICT which is comprised of a single or plurality of evaluation call (ECALL) stack and evaluation return (ERETURN) stack. Said ECALL stack is comprised of storage and control means which receive grant signal from PREDICT and prepare ahead of time a plurality of forthcoming operation and message control steps according to a regular plan-ahead flow control mechanism, said ERETURN stack is comprised of storage and control means for all the exception situations which receive PREDICT's control alert signal that next operation cycle require the invocation and access of a exception operation and/or message control environment. Said PRETURN then prepare ahead of time and fetch the selected exception operation and/or message control operator from PRETURN stack and prepare special procedural control instruction accordingly.

G. Reference Processor (REF)

In a preferred embodiment, the REF 216 provides an fully optimized object-oriented data access facility which can further reference and retrieve the locally or remotely stored script data content corresponding to selected subject of interest, run-time environmental conditions, and user, application, and network request. Per further request, REF 216 can also reference and retrieve the corresponding audio, graphical, and/or video script for selective user, application, and network environment.

The REF 216 can also provide a selective set of alternative pointer referencing means in order to dynamically move, overlay, rotate, enlarge, or reduce a stored compound document objects and its motion video, audio, and graphical script without physically modifying or relocating its corresponding storage address and data content.

The REF 216 is comprised of pointer translation circuit connected to the SMART 212 which receive selected next subject pointer signal and current environment pointer signal and produce the corresponding next segmented script pointer, the REF 216 is also comprised of a address preparation processor connected to said translation circuit which receive next script pointer signal and physical and/or logical base address pointer, and selectively produce effective address pointer signal, logical address pointer signal, or physical address pointer signal. REF 216 is also comprised of data referencing and buffer circuit which send said address pointer signals and reference and retrieve the next corresponding segmented script content. In addition, REF 216 is further comprised of interface circuit connected to OIF 224 which receive user, application, and/or network's request signal and further produce and send supplemental address pointer signals to retrieve additional audio, graphical, and video script, which can be further comprised of a single or plurality of still image background object, and motion video foreground objects corresponding to said subject of interest.

More preferably, REF 216 is further comprised of a single or plurality of pointer manipulation circuit connected to the ENC 208, DEC 206, CON 230, POST 204, and PREP 202 integrated circuits, which receives run-time requests to move, overlay, rotate, enlarge, or reduce a single or plurality of stored document objects, and produces the appropriate alternative referencing parameters to dynamically modify the access address pointer and to manipulate these objects without physically modifying or moving their address and data content.

There is also a run-time adaptive decision-logic circuit connected to the CON 230 and ENC 208, which receive selective run-time bandwidth variables correspond with user, application, and networking conditions, and produces alternative access referencing pointer to select alternative script data content in order to accommodate run-time processing, storage, and/or transmission bandwidth constraints.

H. Evaluation Processor (EVAL)

In a preferred embodiment, the EVAL 214 is able to perform arithmetic and logic operation for the selected script data content according to the encoded and directly executable high level procedural operations.

The EVAL 214 is comprised of data buffer and interface circuit connected to REF 216 which receive and store data content signal for the selected script. There is also instruction buffer and interface circuit connected to ENC 208 which receive and store directly executable encoded high-level instructions. The EVAL 214 is further comprised of a single or plurality of arithmetic and/or logic circuit which sequentially or parallelly process said data content according to said instruction content.

More preferably, the EVAL 214 is comprised of program storage circuit which store a single or plurality sequence of directly executable routines. There is also a interpreter buffer and processor circuit connected to the SMART's ESTACK (Evaluation Stack) which receive high level language operations and directly interpret to executable instructions according to said microprogram routines. There is further interface and buffer circuit which selectively load a microprogram from a plurality of resources and to update the interpreter storage content corresponding to run-time user, application, or network request, reconfiguring and reformatting instruction sequences for a local or remote RISC or CISC host machine, or transmit said executable instruction sequence either remotely or locally to a single or plurality of host machine for further execution.

I. Preprocessor (PREP)

In a preferred embodiment, the PREP 202 (preprocessor) integrated circuit is able to receive input request from user, application, and network and import and retrieve source document script from local sensor, storage, and processor device and perform selective preprocessing functions in a further preferred embodiment, PREP 202 is further able to capture, preprocess, differentiate, and generate compound document script with motion vector and/or frame differential signal for video, image, audio, and/or graphic input files.

The PREP 202 is comprised of interface and buffer means connected to OIF 224 which, when activated, receive local input request signal from a single or plurality of user, application, and/or network. The PREP 202 is further comprised of receiver connected to input sensor which selectively receive electronic signal corresponding to selective binary bit-map image format and/or electronic document format corresponding to fax machine, word processor, electronic mail, database, spreadsheet, desktop printing, and/or desktop publishing. The PREP 202 is further comprised of or interfaced with processor circuit that is comprised of video capturer and/or bit map graphics adaptor, said capturer produces digital video signal corresponding to external RS-170, NTSC, PAL, SCAM or alike video formats. Said bit map graphics adaptor produces digital input signal corresponding to animated graphics and/or still image input file corresponding to PCX, GIF, EPS, TIFF, or alike format.

There is also a single or plurality preprocessing circuit connected to SMART 212 which, when activated, receive instruction from SMART 212 and perform selective function include, but not limit to linear and/or nonlinear filtering, noise reduction, edge detection, thinning, segmentation, pattern matching, and character recognition. said pattern matching and character recognition circuit are further comprised of decision logic circuit which produce selective confidence level corresponding to the uncertainty and error possibility of the partially recognized or matched input image. There is further interface circuit connected to OIF 224 which allow user to interactively edit, verify, and correct if error happens.

More preferably, the PREP 202 is further comprised of or interfaced with a single or plurality of special purpose macroblock-oriented integrated processor and memory array circuit which is specifically designed to optimize the performance of transferring, storage, retrieval, and processing of said input digital signal corresponding to CCITT CIF, SIF, QCIF, or alike macroblock format. Said macroblock processor and memory circuit further produce and store a single or plurality differential frame signal and a motion vector signal corresponding to the sequentially received frames of motion video, still image, or animated graphic files.

Further preferably, the PREP 202 is further comprised of a single or plurality of integrated and pipeline analog and/or digital sensor, processor, and memory array, wherein said sensor element produces the required inputs corresponding to the energy it received, said processor and memory directly receive and efficiently process said analog or digital signal without further latency or bandwidth constraints.

J. Postprocessor (POST)

In a preferred embodiment, POST 204 is able to receive request from user, application, and/or network and perform selective postprocessing functions and convert output signal to bit maps image and/or electronic file format for external printer 154, copier 156, pager, display, television 106, fax 110, computer 108, entertainment and/or communication devices, and in a more preferable embodiment, the POST 204 is further able to output the corresponding compound document script including video, image, audio, and/or graphics.

The POST 204 is comprised of interface circuit connected to OIF 224 which receive input request from a single or plurality of selective user, application, or network. The POST 204 is also comprised of buffer element connected to DEC 206 which retrieve and store said DISC 112 internal formatted signal. There are also a single or plurality of display adaptor (Da) and a print/fax/copier adaptor (Pf) circuits connected to said buffer element which receive DISC 112 internal formatted signal, said Da output adapting circuit produces a VGA, RGB, or NTSC compatible output signal to further display live video, animated graphics, and/or sequential still image. Said Pf adaptor circuit further produces a G3, G4, TIFF, PCX, EPS, GIF or alike output file in order to further print, fax 110, or copy the corresponding compound document for live video, still image, audio, and/or animated graphics. There is further single or plurality of processor circuit connected to SMART 212 which receive instruction from SMART 212 and perform selective postprocessing functions to further improve and enhance quality of the output image signal.

K. Bandwidth Controller (BAND)

In a preferred embodiment, the BAND 228 integrated circuit is able to compute the required communication bandwidth for a local or remote digital video signal and generate a list of run-time attributes for the appropriate compression ratio, frame rate, and display resolution. The BAND 228 is also able to sensitize run-time networking traffic conditions, and dynamically configurate the aforementioned run-time attributes corresponding to the available run-time communication bandwidth. The BAND 228 is further able to sensitize user input, network, or application-specific requirements and interactively update the aforementioned run-time attributes. Preferably, the BAND 228 is further able to exchange a variety of digitally encoded input and output foreign document signals corresponding to intrinsically incompatible document coding algorithms whereby incompatible transmission, storage, retrieval, printing, publishing, and display apparatus can inter-operate through such interface.

The BAND 228 is comprised of a look-ahead-pipeline processor element connected to the PREP 202 and RX 220 integrated circuit, which receives a local or remote inbound differential document signal and motion vector, it then calculate and produce a corresponding run-time attributes signal. The BAND 228 is also comprised of a controller element connected to the FORM 210 (formatting processor), ENC 208 (encoding processor) and CON 230 (system controller), which receives a set of initial run-time attributes according to the algorithmicly pre-determined default parameters retaining within the SLUT 232 (system look-up-table). Provided said document signal is requested by the CON 230 for outbound transmission. The BAND 228 is further comprised of a sensitizing circuit connected to the TX 222 (transmission processor), which can intelligently analyze a plurality of networking traffic conditions, and dynamically configurate the run-time attributes corresponding to the available communication bandwidth. The aforesaid sensitizing circuit will first initiate a request signal sending to the TX 222 along with the required communication bandwidth data, it will then either receive a grant signal from the TX 222 provided the network condition is sufficient, or TX 222 will issue a run-time bandwidth allowance signal to BAND 228 corresponding to the realistic network traffic condition. The BAND 228 will further produce a request for reset signal to the FORM 210, ENC 208, and CON 230 integrated circuits in order to reset the SLUT 232 table, and to configurate the appropriate run-time attributes.

More preferably, the BAND 228 is further comprised of a user/application interface element connected to the FORM 210, ENC 208, and CON 230 integrated circuit which receives a plurality of signals regarding user/operator preference or application-specific requirements, it then send these signals to the processor element and dynamically produce a plurality of optional run-time attributes, the BAND 228 will further interact with the CON 230, FORM 210, and ENC 208 and to finalize the run-time attributes corresponding to the available communication bandwidth.

Further preferably, the BAND 228 will comprised of a inter-operation circuit connected to the RX 220 and TX 222 integrated circuit which receive a inbound document signal from RX 220 according to a SLUT 232 encoded document coding format, it then reset the SLUT 232 parameters and translate the inbound signal into a outbound signal according to another document coding standard, it further reformat the outbound signal and send to TX 222 for further transmission.

L. System Controller (CON)

The CON 230 (system controller) integrated circuit is able to control and coordinate individual subsystem pipeline operations, to maintain and manage overall data throughput, and to sensitize and to adapt with external application, user, networking conditional branches. The CON 230 is also able to initiate, maintain, and update a set of run-time executable system look-up-tables (SLUT's 232), and to facilitate static task prescheduler and look-ahead instruction presequencer corresponding to the specific input document data types. The CON 230 is further able to provide run-time coordination among individual subsystems and to configurate each subsystem's pipeline function to maintain automatically scalable system performance.

The CON 230 is comprised of dynamic data storage and retrieval circuit that is comprised of a single or plurality of system look-up-table (SLUT 232). There is also interface circuit connected to PREP 202 which receives a differential frame bit-map signal corresponding to the specific input data types, said SLUT 232 then cross reference said signal and produce a set of run-time parameters including, but not limited to: compression ratio, frame rate, and display resolution. The CON 230 is further comprised of a task prescheduler circuit connected to SLUT 232 and every internal DISC 112 pipeline subsystems which further translate the selective run-time SLUT 232 parameters into a specific set of run-time encoding, decoding, and frame updating instruction sequences for the corresponding pipeline ENC 208, DEC 206, and POST 204 integrated circuits.

More preferably, the CON 230 is comprised of a scalable system control circuit which receive and analyze each pipeline subsystem's performance capability and produce selective internal data format to accommodate the available processor, transmission, and storage bandwidth and power requirement. Said system control circuit is comprised of a dynamic system configuration circuit which sensitize internal run-time intermittent critical-paths, temporary power shortage, subsystem data grid-lock, networking conditions changes, change of priority, user preference changes, and application requirement change. Said controller also include run-time pipeline synchronization circuit which sensitize and register the abnormal instances for all DISC 112 subsystem's pipeline operations, and send a system-wide alert signal while requesting for further fine-tuning of the SLUT 232 (system look-up-table), the CON 230 would examine the bottlenecked subsystems, identify their overload causes, and then authorize alternative SLUT 232 parameters to temporarily scale down the specific subsystem performance requirement, the CON 230 will also issue a selective set of control signals including, but not limited to: task redirection, conditional branch insertion, data reformatting, NOP insertion, threading, or delay branching to adjust the specific overloaded subsystem. The CON 230 will also issue alternative DISC 112 internal data format to temporarily relieve system's performance requirement and still to maintain the overall system throughput. When said emergency condition is relieved, CON 230 issue system wide acknowledgment signal and resume overall pipeline synchronization and operation.

3. OPERATIONS OF DISC

Figure 3:
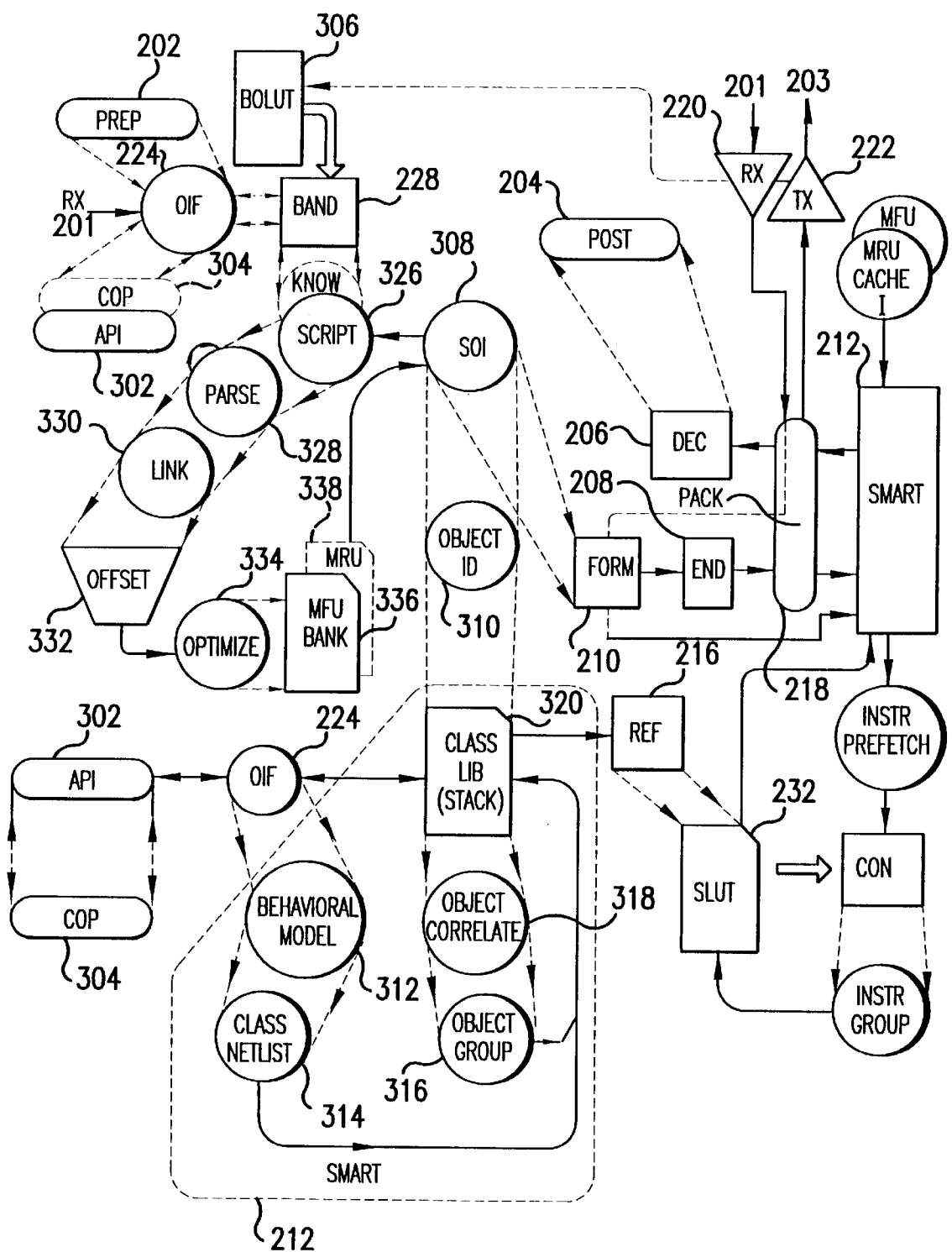
FIG. 3 illustrates the major functional operations for a DISC (document instruction set computing) integrated circuit in accordance with the present invention.

FIG. 3 illustrates the preferred functional principle, operations and methods for the design and implementation of a DISC 112 integrated circuit computer and communications system. The DISC 112 is particularly characterized by its ability to handle high order compound document object-directed task execution directly in hardware in file format at high rates of speed, and it can be better understood by considering the operation routines used in the present invention. It is worth mentioning that, instead of focusing on the specific implementation and apparatus, we intend to address all the critical methods which are required for a generic DISC 112 system realization. It is equally our intent that, as dictated by the particular user, application, and/or networking requirement, these methods can be applied toward implementation in a plurality of technologies other than integrated circuit.

A. Document-Directed Task Execution

Contradictory to the traditional RISC and CISC principle, which primary focus have been strictly on the run-time program control and run-time memory management in order to optimize for computation intensive application. DISC 112 requires the retrieval, compilation, and evaluation of receiving document data and the proper match with initial set requirement and subject of interest from selective application, user, and/or network environment prior to any of the corresponding run-time execution steps can be issued.

Consider first the Document-Directed Task Execution routine, in the presently illustrated embodiment, DISC 112 is comprised of operation means in PDB 226 (personal database) which organize and manage object-oriented data structure for personal knowledge. It is also comprised of operation means in FORM 210 which query, select and establish subject of interest corresponding to specific user, application, and/or network requirement, said FORM 210 is further comprised of operation means to issue document request. There is also a operation means in DEC 206 which accurately decode receiving document and convert into DISC 112 internal format. Said FORM 210 is further comprised of query and comparison means which search through all possible reference resources and analyze and identify the most suitable target material. Said FORM 210 is also comprised of compilation means which parse receiving target document into selective segmented scripts. There is further operation means in SMART 212 which produce a single or plurality of executable and non-executable tokens corresponding to said segmented script, wherein said non-executable token is further stored in a operand stack means in SMART 212, said executable tokens is translated into a procedural or functional pointer in SMART 212, DISC 112 is further comprised of operation means in REF 216 which further reference said procedural and/or functional pointer with a build-in dictionary and/or system look-up-table (SLUT 232) in CON to fetch and select the appropriate opcode operating sequence. DISC 112 is further comprised of operating means in CON (system controller) which further store and fetch said opcode from a opcode stack, and further authorize operating means in REF 216 (referencing processor) and EVAL 214 (evaluation processor) to execute corresponding procedural and/or functional steps specifically for said retrieved target document. Furthermore, DISC 112 is comprised of operating means in CON which dynamically update said SLUT 232 (system-look-up-table) content to accommodate run-time user, application, and network conditional changes This significantly improve the cost performance for document-directed database retrieval and task processing applications. Comparatively, prior arts in accordance with traditional RISC or CISC methodologies have only shown incremental improvement on individual or selective group of computation-intensive tasks such as document compression/decompression, and bandwidth operability for selective networks.

B. ObJect-oriented Knowledge Management

A method is implemented in the circuitry of FIG. 3 to perform object-oriented personal knowledge management by machine hardware. The DISC 112 is comprised of operating means in PDB 226 (personal database) which store, update, and retrieve personal knowledge content. There is also operation means in PACK 218 that is comprised of OIF 224 (object interface) circuit which receive knowledge content inputs from external user, API 302 (application programming interface) and/or COP 304 (coprocessor). Said PDB 226 is further comprised of operating means which establish Behavioral Model of said input knowledge that is comprised of Class Netlist, wherein each Netlist is further organized as sequence of class descriptors with associated pointers to the prior hierarchy (source) descriptor and the next hierarchy (destination) descriptor, said Netlist provide proper description for said input knowledge content. The DISC 112 is further comprised of stack operation means in PDB 226 that is comprised of a single or plurality of Class Lib (Class Library) which store said class descriptors and corresponding source and destination pointers for further knowledge retrieval. There is also operation means in PDB 226 which perform correlation among object and formulate composite Object Group. Said Object Group can be entered into Class Lib to establish higher class hierarchy. Furthermore, each said Class Lib elements is assigned a unique Object ID (object identification) which interface with external user, application, and/or network through said OIF 224 (object interface). There is also a operation means which select appropriate set of OIF 224 to correspond and match with external subject of interest (SOI). DISC 112 is further comprised of interface operation means in REF 216 which access Class Lib and produce selective procedural and functional pointers corresponding to said personal knowledge content.

C. Compound Document Retrieval and Compilation

Compound document retrieval and compilation is performed in a circuit of FIG. 3. This method makes DISC 112 possible to retrieve, interpret, substantiate, correspond, and maintain a multitude of compound document objects over a wide range of communications networks. Furthermore, DISC 112 requires and provides additional real time performance for query, reasoning, compilation, decoding, and interpretation of the incoming data streams prior to any instruction authorization or document execution.

DISC 112 is comprised of operation means in PACK 218 that is further comprised of OIF 224 circuit which retrieve input document data, said OIF 224 also receive run-time attributes corresponding to particular network, application, and user conditions. There is also operation means in BAND 228 which request and receive run-time network condition and determine the bandwidth allowance corresponding to a bandwidth look-up-table (BOLUT). There is further means in FORM 210 which interpret and substantiate said input document. Said means is first comprised of parser means which partition said document into the smallest independent internal unit that is comprised of segmented script modules. Said means is further comprised of Internal Link means which bind a plurality of internal unit together to establish larger external unit wherein each link corresponding to an internal procedural call. There is further External Link means which bind a plurality of external unit together wherein each external link corresponding to a external procedural call.

There is further pointer manipulation means in FORM 210 which produce offset pointer corresponding to each said segmented script, and a Optimize means in FORM 210 which rearrange procedural call sequences to optimize run-time performance. There is additional query means which request list of subject of interest corresponding to selective run-time user, application, and network environment. There is ENV. Point means in REF 216 which produce segment pointer for further retrieving the content of selective segmented scripts.

There is further stack means for storing run-time procedure and object sequences in REF 216 and EVAL 214 which further produce opcode and operand calling sequence corresponding to SLUT 232. There is further call return sequence in stored in SLUT 232 which provide look-ahead instruction pipeline.

As a result, the methodology for DISC 112 becomes intrinsically different. RISC or CISC's primary focus are to optimize run-time computation performance, i.e., instruction authorization, decoding, pipelining, arithmetic and logical execution, and memory control and management. Comparatively, all DISC 112 instruction groups are issued and executed to facilitate run-time document manipulation, and to conform specific application, networking, and user priority requests.

D. Adaptive Internal System optimization

FIG. 3 illustrates the internal system operation of DISC 112 and in particular, the adaptive internal system optimization circuit of the present invention. The adaptive internal system optimization circuit employed in the present invention is comprised of the following steps:

Firstly, the step of allowing DISC 112 for 100% recognition for incoming document data through front-end data decoding subsystem and techniques, wherein prior arts in CISC and RISC only rely on traditional OCR (optical character recognition) techniques to compute, analyze, and recognize characters strings according to individual shapes and contours. As a result, the incoming data streams are decoded to selective internal DISC 112 optimized data format, which include but not limit to the 8 or 16 bit universal character encoding forms. The 8 or 16 bit universal character encoding forms have been used in the example, only for the purpose of clarity.

Secondly, the step of dynamically optimize individual subsystem performance and power consumption for all performance critical DISC 112 subsystems include but not limit to: document identification, manipulation, compilation, encoding and decoding, interpretation, storage and retrieval. Said subsystem optimization method is further comprised of a plurality of selective SLUT 232 (system look-up-table) which can accommodate a plurality of selective run-time conditional changes to conform specific application, networking, and user priority requests. Said optimizer is further comprised of instruction look-ahead prefetcher and group prefetcher in order to accelerate instruction processing.

Thirdly, the step of continuously monitoring run-time internal critical path, and reducing internal processing load through selection and setting of a coarser representation of internal data format and/or increase of clock speed for particular overload subsystem, said monitor further maintain balanced system-wide power and performance throughput, and resume normal internal data format assignment for said subsystem when critical path is unlocked.

Fourthly, the step of translating high level procedural and functional operation into directly executable intermediate high level language instruction set.

Fifthly, the step of organizing said directly executable instruction set in a call stack and a return stack, wherein call stack can optimize normal external procedural call entry, control, and set up of new activation record, the return stack can optimize exception handling including normal external procedural call return, control, and resume of a previous activation record.

Sixthly, the step of look-ahead control of said call stack and return stack, wherein controller can sequence through call stack during normal procedural flow, and identify forthcoming change of procedural/program control, and initiate and start simultaneously sequence through appropriate return stack location to maintain pipeline coherence.

Seventhly, the step of optimizing said intermediate high level language instruction set for selective set of popular host language which including, but is not limit to: C, C++, and SQL. wherein said high level instruction set can be directly executed in a external DISC 112, CISC, or RISC machine without further compilation step required.

As a result, DISC 112 focus on performance optimization other than the traditional RISC and CISC run-time data computation. the RISC and CISC may offer superior performance for numerical intensive data computation, wherein DISC 112 is specifically optimized for document retrieval and subsequent procedural authorizations.

4. DISC ARCHITECTURE AND ORGANIZATION

The present invention incorporates a number of unique architectural properties in respect to the direct query, compilation, manipulation, management, and retrieval of compound document data types. The present invention also provides an unified microprocessor suitable for the direct operation and inter-operation among document-intensive system means including, but not limit to: personal communications, client-server computing, and multimedia database retrieval. Before describing these architectural properties in further detail, the internal data and system organization should be understood.

A. Hierarchical Procedure Engine

Figure 4:
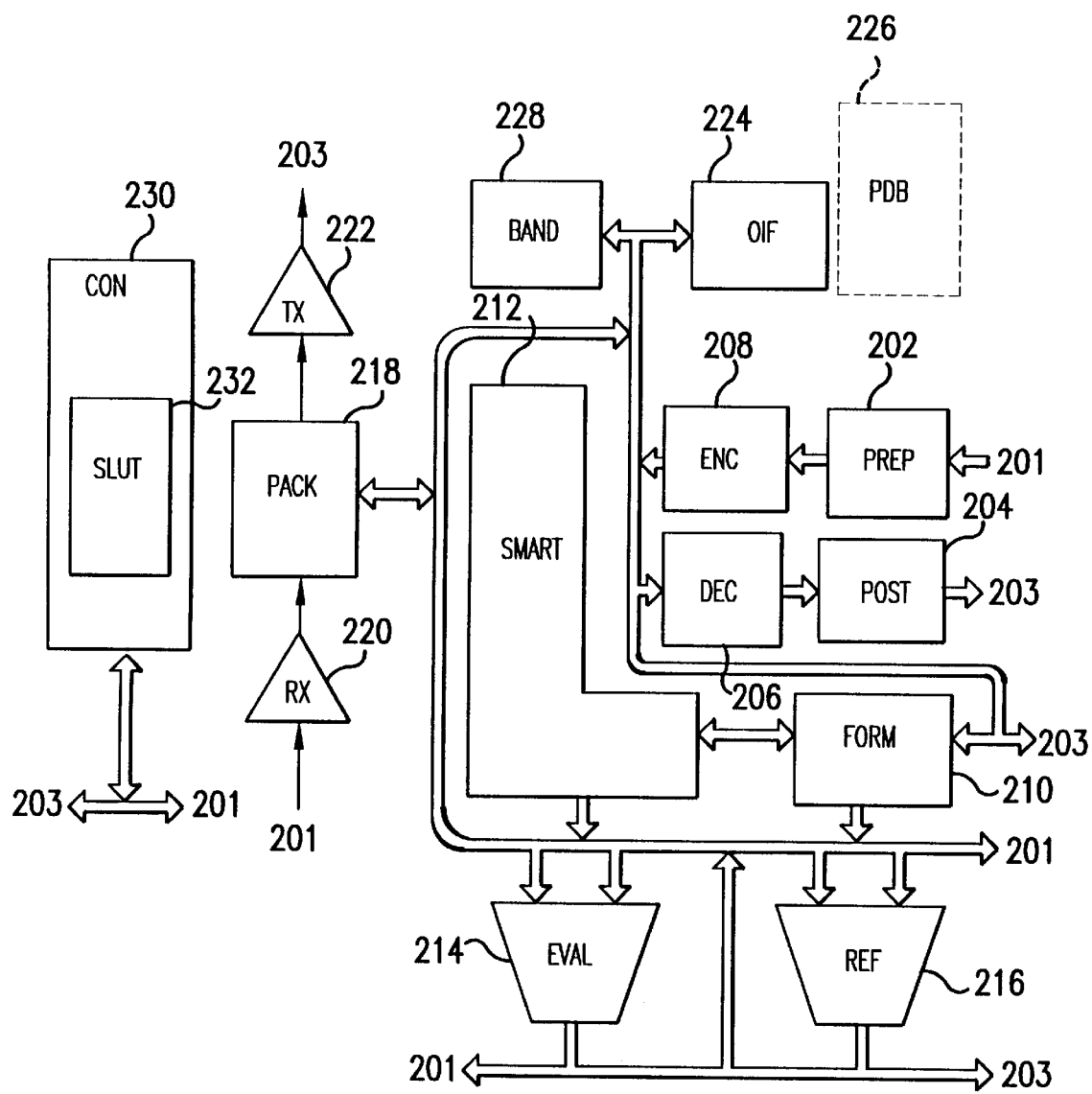
FIG. 4 illustrates the architecture and organization of the present invention and a single chip integrated circuit implementation for compound document computing.

As shown in FIG. 2B and FIG. 4, the present invention is comprised of the following architectural means which compile, link, process, and manage single or plurality hierarchy of high-level-language procedural calls.

Firstly, the means of FORM 210 integrated circuit which partition application specification into a single or plurality hierarchy of independently executable modules. There is further means that partition each module into single or plurality of executable sub-modules.

Secondly, the means of SMART 212 integrated circuit which produce the corresponding call pointer data structure for each modules or sub-modules, wherein said data structure is comprised of procedure call stack and operand call stack, said procedure call stack is comprised of a sequence of next procedure pointer address which correspond with the next normal execution steps for said module, said operand call stack is further comprised of the sequence of next data pointers which correspond with the local variables' scope for said modules.

Thirdly, the means of SMART 212 integrated circuit which produce the corresponding return pointer data structure for each modules or sub-modules, wherein said data structure is comprised of procedure return stack and operand return stack, said procedure call stack is comprised of a sequence of previous or alternative procedure pointer address which correspond with the conditional or exceptional execution steps for said module, said operand return stack is further comprised of the sequence of previous or alternative data pointers which correspond with the local variables' scope for the previous or alternative call modules.

Fourthly, the means of SMART 212 integrated circuit which produce the corresponding auxiliary pointer data structure for each modules or sub-modules, wherein said data structure is comprised of a single or plurality of auxiliary procedure stack and a single or plurality of auxiliary operand stack, said procedure stack is comprised of a plurality sequence of previous and next procedure pointer, for example: N−2, N−3, . . . , and N+2, N+3, . . . , wherein N represent the present procedure. said operand stack is further comprised of a plurality sequence of next, previous or alternative data pointers which correspond with the local variables' scope for the call destination modules.

Fifthly, the means of SMART 212 integrated circuit which produce the corresponding bit mapping logic for monitoring each module or sub-module's execution, wherein said bit map logic look-ahead monitor and foresee either the conditional or exceptional procedural steps are arriving or change of activation record is required, then said logic further locate and prefetch the appropriate procedure pointer and data pointers to maintain pipeline coherence.

B. Object-oriented Transaction Processor

As shown in FIG. 4, the present invention is comprised of the following architectural means which compile, link, and manage single or plurality of object and class and method library through setup and termination of the corresponding procedural call modules:

Firstly, pointer means for defining and unique identifying object which correspond with single or plurality of application module or sub-module, wherein said object represent a particular subject of interest from the user, application, or network. There is also pointer means for further defining and identifying sub-object which represent more detailed subject of interest, wherein said sub-object locate at the next lower level of this object hierarchy. There is further pointer library means which list all the available object and sub-object with proper hierarchy level identifier. There is further pointer register and/or stack means which record the properly selected execution path from user, application, and/or network that is further comprised of sequence of object and sub-object each with corresponding hierarchy identifier.

Secondly, pointer means for defining class, wherein said class correspond with high-level behavioral descriptor of a object. there is also means for defining a plurality of sub-class which selectively inherit a complete or subset of global properties from its parent, wherein each subclass correspond to a particular user, application, and/or network run-time environmental specification. There is further means for overwriting the global properties inheriting from its parent during run-time environmental condition changes. Furthermore, there is also class library means which list all the available class which can be selected by application, user, and/or network.

Thirdly, pointer means for defining a method library, wherein said method library correspond with single or plurality of function, procedure, and/or subroutines which can be invoked at the user, application, and/or network request in order to manipulate said object. Said pointer means is further comprised of referencing means which correspond with system look-up-table (SLUT 232) that can be update and download corresponding to run-time application, user, and network requirement.

Fourthly, pointer means for defining single or plurality of message interface port, wherein said message pointer descriptor means correspond with single or plurality of internal or external procedure calls which can be established to interface with said object. Said message pointer is also comprised of logic means which look-ahead, prepare, and prefetch the required value or reference location for a selective set of parameters and/or arguments which is required to be transported from caller to callee for all the forthcoming procedural calls.

Fifthly, application-specific compiler means for selecting the appropriate assembly of class, object, methods, and message from the library and correspond to application-specific run-time requirement from user, application, and network. Said compiler means further comprised of logic means which communicate with the system controller (CON) integrated circuit and select a particular set of system look-up-table (SLUT 232) which meet real time performance requirement for said application.

Sixthly, pointer means for defining polymorphism for said object wherein said pointer support a selective set of data types including, but not limit to data, voice, image, graphics, ink, and video. Said pointer apply the designated data types corresponding to requirement and run-time constraint from user, application, and network.

Seventhly, circuit-switched transaction execution means in PACK 218 integrated circuit which allocate single or plurality of time slot and assign each single or aggregate slot for the designated transaction processing task correspond with said object, class, method, and messages, wherein said means cooperate with said run-time attribute control means to prefetch and determine the appropriate system look up table which guarantee to perform deterministic multi-tasking, said means further maintain data persistency wherein permanent data set will not be updated or modified until the transaction is completed. In order to further maintain system throughput, there is a state machine means which continuously monitor and issue the invocation and termination of each normal, conditional, and exceptional transaction and branch to alternative execution path when run-time condition changes arises.

C. client-server Protocol Kernel

As shown in FIG. 2B and FIG. 4, the present invention is comprised of the following architectural means, which allow for real-time performance of multiple layered protocol functions including, but not limit to, data formatting and program flow control, for integrated operating systems that include application programming interface and network communication capability. Said protocol kernel is designed to simplify hardware implementation and to optimize operating system performance in distributed client-server environment.

Firstly, the means for operating system to receive run-time request for performing a selective set of protocol functions, wherein each of the protocol functions is assigned with an integer n that can be ranged from 1 to N, N is the integer representing the highest protocol layer determined by the operating system to implement these run-time callable protocol functions. For each particular layer n, the operating system further examine, partition, and schedule the run-time execution order for each of the assigned protocol function embedded in that layer. As an example, when the operating system receives request to perform OSI standard during a particular run-time environment, the system will determine the highest protocol layer as 7, and make the following assignment:

| | | |
|---|---|---|
| 1. | Application Layer, | n = 7 |
| 2. | Presentation Layer, | n = 6 |
| 3. | Session Layer, | n = 5 |
| 4. | Transport Layer, | n = 4 |
| 5. | Network Layer, | n = 3 |
| 6. | Link Layer, | n = 2 |
| 7. | Physical Layer, | n = 1 |

Secondly, the means of a processor kernel which execute selective set of layer n protocol functions. Said kernel is comprised of a program memory that receive and store the required receiving and transmitting function sequence for protocol layer n. There is also a data path processor that is comprised of transmitting data path processor and receiving data path processor which further execute designated layer n protocol function corresponding to selective transmitting and receiving instruction sequence retrieved from said program memory. There is further buffer means that is further comprised of input transmitting buffer, output transmitting buffer, input receiving buffer, and output receiving buffer. Said input transmitting buffer first request, acknowledge, and receive outbound data from the output transmitting buffer of next higher layer n+1, it then transfer data to said transmitting data path processor to perform the designated sequence of protocol functions including data formatting required within layer n, it finally transmit the resulting data to input transmitting buffer of next lower layer n−1. Reversely, said input receiving buffer first request, acknowledge, and receive inbound data from the output receiving buffer of the next lower layer n−1, it then transfer the data to said receiving data path processor to perform the sequence of designated receiving protocol functions including data deformation within layer n, it finally transmit the resulting data to input receiving buffer of next higher layer n+1.

Thirdly, control means which define program control schedule for a designated protocol layer n. Said control means is comprised of state machine means which interpret and maintain and control the program procedural flow within protocol layer n, there is also a scheduler means that schedule, determine and maintain a sequential or parallel implementation of said program procedural flow.

Fourthly, load control means which define the system throughput for transmitting outbound and receiving inbound data. Said control means further comprised of iteration, cascading, parallel, and arbitration modes. Said iteration mode set the default and allow for single DISC 112 device to sequentially perform layer n functions from 1 to N or vise verse at a particular time slot. Said cascading mode allow multiple DISC 112 devices to operate in pipeline. For example, OSI protocol will require seven DISC 112 devices to cascade together wherein each is responsible for one of the seven protocol layer function. Said parallel mode allows for multiple DISC 112 device to operate for layer n protocol in parallel. Finally, said arbitration mode allow for single or multiple DISC 112 devices to dynamically arbitrate and select the appropriate time slot aggregates or protocol functions for each of the DISC 112 processor element to maintain consistent overall system throughput.

Fifthly, means for defining procedure stack for the designated protocol layer n. Said procedure stack comprises register or stack means which simultaneously retain selective set of previous, present, and forthcoming procedures corresponding to all potential regular, conditional, and abnormal program execution. There is also a program control means which look-ahead and foresee conditional branch, external call or other exceptional situations and switch to appropriate stack pointer location to maintain pipeline consistency.

Sixthly, means for defining operand stack for the designated protocol layer n. Said operand stack comprises register or stack means which concurrently retain selective set of previous, present, and forthcoming activation records corresponding to all potential regular, conditional, and abnormal program execution. There is also a program control means which look-ahead and foresee conditional branch, external call or other exceptional situations and switch to appropriate stack pointer location to maintain pipeline consistency.

Seventhly, pointer means for defining remote procedure call which send request to solicit external DISC 112 device to perform the required forthcoming protocol procedures and/or to update to the forthcoming activation record wherein said controller foresee the internal DISC 112 device will become overloaded due to run-time condition changes request received from user, application, and/or network.

D. System and Program Abstraction

As shown in FIG. 2B, FIG. 3, and FIG. 4, the present invention is comprised of the following architectural means, which allows for real time abstraction of the external system and program. Said system abstraction means allows for DISC 112 to perform time-critical microkernel functions for external operating system and database management system and to collaborate with multiple external DISC 112 device for planning and scheduling local and remote procedural calls in enterprise-wide workgroup computing. Said program abstraction means further allows for software developer to prototype and produce direct executable object code with built-in security of selective encapsulation and coding for its high level language source code.

Firstly, the means for system abstraction layer (SAL) which allow for the internal controller (CON) to perform time-critical microkernel functions for a plurality of external operating system and database management system, that include, but not limit to: UNIX's, NT, OS2, WINDOW, DOS, and alike. Said SAL layer selectively correspond external system's microkernel messages with internal system's command, control, and communication protocols and procedures via TX 222, RX 220, and PACK 218, said time critical microkernel functions include, but not limit to: execution and scheduling for multiple threads, synchronization for multiple process, and translation and mapping for high-level system objects.

Secondly, the means for supporting language-specific interpreter in CON, wherein high level source language procedures selectively translate to its most optimized object code that is directly run-time executable, said means further comprises microprogram memory means within CON which store, select, and retrieve said interpreter code.

Thirdly, the means of receiving a plurality of forthcoming procedural and/or protocol call messages from external operating system and database management (CON), buffering and preparing said call message sequence for internal processing (PREP 202), establishing pointer data structure for activation record and environmental pointer which correspond with said procedural and/or protocol call sequence (FORM 210), transferring said pointers to assemble run-time procedural call and return stack (SMART 212), interpret said high-level source procedures for calls and returns to selectively coresponding with selective microprogram interpreter code (CON), and formulate direct run-time executable object code (ENC 208).

Fourthly, the means of providing local and/or remote procedural or protocol call processor in CON which collaborate with single or plurality of external DISC 112 devices, wherein said procedural and/or protocol call processor send request signal when the internal functional resource for the forthcoming operation and/or transaction become unavailable, said call processor then hold said operation and/or transaction in wait sate until it further receive acknowledgment signal that identify and/or describe the external available functional resource, said call processor then initiate call set-up procedure with the external DISC 112 device and establish the selective pointer data structure for local activation record, environmental pointers, and the argument and parameters, said call processor further transfer program control to external callee in order to invoke the next operation and/or transaction, said call processor further prepare call termination and return procedures in preparation for the external device to complete the transaction and return program control with resulting data to caller. Said call processor further resume and continue operation and/or transaction after regaining program control.

Fifthly, the means for providing portable software module that is further comprised of said direct executable object code, selective high-level-language interpreter microprogram code, and local and/or remote procedural call schedule table.

Sixthly, the means for encapsulating said object code with selective layers and/or functions of control and maintenance protocol stacks (POST 204), wherein said encapsulated object code can only be decoded to source program with the appropriate decoding and/or decryption routine at the authorized receiver (DEC 206). Further, said encapsulated object code can be segmented into frame, packet, or cells, and be further relayed across the communication network (PACK 218, TX 222, RX 220) without protocol conversion and termination.

Seventhly, the means for code object abstraction layer (CAL) which provide universal binary program interface wherein resulting binary code can be selectively disseminated for a plurality of run-time execution environment including RISC and CISC.

E. Single Chip Implementation

FIG. 4 illustrates the design example of a single chip DISC 112 integrated circuit, which provide an universal microprocessor solution for operation and inter-operation of desktop and handheld systems to perform selective compound document-intensive functions that include, but not limit to: copier, fax machine, printer, scanner, personal communicator, client-server computing, and multimedia database retrieval. We also include built-in architectural support for all kernel functions of compound document computing on chip, therefore provide cost performance advantage and allow for software to expand on high level applications for compound document computing.

For illustration purpose, we have implemented our design on a single chip integrated circuit. However, same design principle can be equally applied and implemented on multi-chip-module or any other viable or equivalent means.

The diagrammatic representation illustrated in FIG. 4 comprises a suite of system components to function in a distributed client-server computing environment. A server will typically require a single or plurality of the higher performance system component wherein client may only require a selective subset. These system component are: preprocessor (PREP 202), encoding processor (ENC 208), postprocessor (POST 204), decoding processor (DEC 206), formatting processor (FORM 210), object smart memory (SMART 212), evaluation processor (EVAL 214), referencing processor (REF 216) packet processor (PACK 218) that further include object interface (OIF 224), transmission processor (TX 222), receiving processor (RX 220), personal database (PDB 226), bandwidth controller (BAND 228), and system controller (CON) that further include system look-up-table (SLUT 232), These system components are interconnected on-chip through a single or plurality of SYSTEM BUS and CONTROL BUS. The CONTROL BUS allows for SMART 212, CON, BAND 228, and SLUT system controllers to communicate with each other and to transceive control signals to the remanding data path processor including PREP 202, POST 204, FORM 210, ENC 208, DEC 206, EVAL 214, REF 216, PACK 218, and PDB 226. The SYSTEM BUS provides internal data transfer which further comprise a plurality of BUS TRANSFER modes, wherein standard DEFAULT mode allows for PACKET SWITCHED signal transportation of data, control, and operation maintenance packets among various system components, a plurality of CIRCUIT SWITCHED modes also allow for burst transportation of full frame, partial frame, live motion objects, graphics overlay, or other compound DISC 112 data types. Both SYSTEM BUS and CONTROL bus provide bidirectional parallel transfer.

Due to the real time requirement for performing synchronous frame based compound document processing, a single or plurality of system-wide pipeline can be designed. For example, a local signal communication pipeline which comprises direct connection between PREP 202-ENC 208-FORM 210 and POST 204-DEC 206-FORM 210 to maintain local signal throughput, a application priority pipeline which comprises of direct connection between PDB 226-BOLUT (BAND 228)-SLUT 232 (CON)-FORM 210-OIF 224 (PACK 218) to maintain run-time conditioned throughput upon user, application, and network request. Finally, remote signal communication pipeline which comprises direct connection between the RX 220-PACK 218-TX 222, PACK 218-SMART 212-FORM 210, and DEC 206-FORM 210-ENC 208 to maintain remote communication throughput. In order to facilitate pipeline connections, first-in-first-out memory devices are inserted where appropriate.

Private buses are provided between RX 220-PACK 218, PACK 218-TX 222, FORM 210-SMART 212, FORM 210-PREP 202, FORM 210-POST 204, ENC 208-DEC 206, OIF 224-PDB 226, SMART 212-EVAL 214, and SMART 212-REF 216.

The diagrammatic representation illustrated in FIG. 4 comprises the following input/output. For server implementation, they are 32 bit data input pins, 32 bit data output pins, 32 bit application parallel input/output (PIO) pins, 24 bit tag/control input/output pins, and 8 bit serial communication input and output (SIO) pins. For a low cost client, the above input/output can be significantly reduced and time multiplexed.

The first group of 32 data input pins connected to PREP 202 which receive four set of individual eight-bit digital compound document input data, i.e., red (R), green (G), blue (B), and character (K). These input pins can be further time multiplexed to receive additional address, status, tag, control, timing, and interface signals. They can also load program and data directly from off-chip.

A second group of 32 output pins connected to POST 204 which produce four sets of eight-bit output signals for external display, printing, or fax. These output pins can be also time multiplexed to transmit internal address, status, tag, control, and interface signals, and to export program and data directly to external memory.

The input and output data ports can further be multiplexed to form a single group of 32 bidirectional input/output pins in a baseline implementation. Furthermore, additional input and output pins can be included for transporting address, tag, control, status, and other miscellaneous signals.

There is a third group of 32 bi-directional parallel input/output (PIO) pins connected to PDB 226, which is multiplexed to import and export a plurality of control and data signals including but not limited to: application and system control commands, priority requests, application requirements, communication and status messages, and program and data sequences.

For a more baseline implementation, PIO can be reduced to 8 or 16 pins for lower post packaging. Reversely, PIO can also be expanded to 64 or higher for higher performance implementation. PIO can further be connected to a time-division-multiplex (TDM), packet-division-multiplex (PDM), local bus interface (LBI), or small computer system interface (SCSI) circuits to facilitate the high speed burst transportation.

There is further a fourth group of 24 tag and control input and output pins connected to the SLUT 232 and CON, which provides the required power, ground, clocking, timing status, control and tag signals. The pins numbers can be modified according to system performance requirements.

There is further a fifth group of 8 serial communication input and output (SIO) pins connected to the RX 220 and TX 222, which simultaneously receives and transmits four channels of full-duplex document signals. The SIO pins numbers can be modified to meet application requirements.

The PREP 202 integrated circuit is comprised of document preprocessors with a optional motion processor, which receives analog or digital document, graphics, or still images and generate FRAME DIFFERENTIAL BIT MAP, MOTION VECTOR, and MACROBLOCK profile for each input frame.

The CON is comprised of SLUT 232 circuit which receives FRAME DIFFERENTIAL BIT MAP from SMART 212 and produce a run-time bandwidth profile for each input frame including compression ratio, frame/scroll rate, and display resolution. The CON is also comprised of a INSTRUCTION LOOK-AHEAD circuit which receive a GRANT signal from BAND 228 and translate the run time bandwidth profile into a group of predefined instruction address pointers. The CON is further comprised of a GROUP INSTRUCTION PREFETCH circuit which receive the instruction pointers and produce a sequence of run-time executable instructions for the input frame.

The BAND 228 integrated circuit is comprised of a BWREQ circuit which receive the FRAME DIFFERENTIAL BIT-MAP from PREP 202 and produce a run-time bandwidth requirement (BWREQ) signal for each input frame. The BAND 228 is also comprised of BWCAP circuit which during the DISC 112 system initialization (SETMODE), receives a set of bandwidth constraints relating to internal processing and storage and external communication. The BAND 228 is further comprised of a BWALLOW circuit which compare the system bandwidth constraints with the BWREQ signal and determine whether the DISC 112 system has sufficient run-time bandwidth. Provided the bandwidth is sufficient, the BAND 228 will generate a GRANT signal to CON in order to enable the SLUT 232 to search and prefetch the run-time instruction sequences. Provided the bandwidth is insufficient, the BAND 228 will issue a CONDITIONAL BRANCH and request the FORM 210 to reformat the input frame and further reduce the run-time bandwidth requirement.

For compound document including motion video, the FORM 210 is comprised of a OBJECT ID circuit, which receives standard MACROBLOCK subimages from PREP 202 and produce a list of moving objects for each input frame. The FORM 210 is also comprised of a PRIORITY ASSIGN circuit which evaluate application requirement from OIF 224 and communication constraint from BAND 228 and assign the appropriate run-time priority level to each moving object and MACROBLOCK subimage. Provided the run-time bandwidth is insufficient, the FORM 210 is further comprised of an X-Y INTERPOLATE circuit which receive MACROBLOCK subimages, moving objects, and their associated run-time priority levels and produce a reformatted MACROBLOCK subimage and moving objects. When the run-time bandwidth is proven to be sufficient, the FORM 210 is further comprised of DATA TRANSFER circuit which transfer the formatted macroblock subimage to ENC 208 and PACK 218 for further processing.

The ENC 208 is comprised of a programmable ENCODING circuit which receive input macrblocks and generate JPEG, MPEG, H.261, VQ, or alike encoded document tokens depending on the application requirement. The ENC 208 circuit also perform all pixel domain and transform domain encoding functions.

The PACK 218 is comprised of a PACKETIZER circuit which receives internally reformatted macroblock subimage and further partition into a plurality of data packets. The PACK 218 is also comprised of a PACKET CONTROL circuit which produce required control messages for both internal and external data movement, error detection and correction, and flow control management functions. The PACK 218 is further comprised of a PACKET/CIRCUIT BUS INTERFACE circuit which program the internal bus into a packet switch mode or a selective high speed burst circuit modes for the transportation of moving objects, macroblock subimages, or full frame images.

The SMART 212 is comprised of a SCALABLE OBJECT MEMORY ARRAY which receives data packet from PACK 218 and automatically self-configurate into a plurality of internally formatted object entities for storage. The SMART 212 is also comprised of a REFORMAT circuit which receive run-time bandwidth constraint from BAND 228 or receives a run-time application priority request from OIF 224 and self configured to the appropriate data storage format conforming to these run-time networking and application requirements. The SMART 212 is further comprised of a FOREGROUND PROCESSOR circuit which transceive, prioritize, manipulate, and store foreground data objects. The SMART 212 is further comprised of a BACKGROUND PROCESSOR circuit which can transceiver, prioritize, manipulate, and store background data macroblocks.

The REF 216 is comprised of a DATA REFERENCING circuit which generates the address pointer reference list for data storage and retrieval. The EVAL 214 is comprised of DATA MANIPULATION circuit which rotate, linear shift, enlarge, or reduce the specified data object. The PDB 226 is comprised of a SIMULATOR circuit which generate instruction sequences for visualizing artificial knowledge and object data movement.

The TX 222 and RX 220 are comprised of a pair of TRANSCEIVERS circuit which import and export compound document data. The TX 222 is also comprised of an QUERY circuit which produce a REQUEST signal to inquire external networking and bandwidth stability conditions. The RX 220 is also comprised of an INTERPRETER circuit which receive and decode external networking and bandwidth control information and produce a ALERT signal to BAND 228 when abnormal networking conditions take place.

For compound document that requires motion video, the DEC 206 is comprised of a programmable ENCODING circuit which receives encoded macroblock tokens and generate JPEG, MPEG, H.261, VQ, or alike macroblock pixel images corresponding to the application specification. The DEC 206 circuit further perform all pixel domain and transform domain decoding functions.

The POST 204 is comprised of a plurality of analog and digital post processors. For compound document that requires motion video and animated graphics, POST 204 receives digital decoded document pixel runs and generate the appropriate formatted signal for NTSC, PAL, SCAM, RS-170, G3, G4, or EPS.

The OIF 224, as part of the PACK 218, is comprised of a INTERFACE circuit, which receives application priority requirements from user, application, and/or network and produce the appropriate message signal to FORM 210 in further assigning the run-time priority levels for each object and subimage. OIF 224 is further comprised of DRIVER circuit which allow direct interface with a plurality of external commercial DOS, UNIX, WINDOW, NT, or OS2 application programs. OIF 224 is also comprised of a programmable BIOS circuit which direct execute under a commercial operating system.

The BOLUT, as part of BAND 228, is comprised of a set of system LOOK-UP-TABLE logic circuits which dynamically produce a plurality options for compound document data type selections. The BOLUT is also comprised of a PRIORITY SENSITIZER circuit which receive RUN-TIME APPLICATION PRIORITY request signal from OIF 224 and produce appropriate set of run-time media profile for further execution.

5. SUMMARY AND ADVANTAGES OF DISC

Each of the above aspects of the invention, when taken together, result in a significant improvement in the integrated circuit design of document data processors. The document processor of the present invention provides an optimized hardware system kernel for compound document processing functions for a wide range of business, commercial, consumer, communication and industrial system applications; it also provides an unprecedented level of capability, safety, and reliability with high performance and low cost, to make it suitable for many desktop, handheld, and embedded system implementations. Document processing is distinctively different from data computation and does not require intensive arithmetic operation, due to the fact that RISC and CISC do not provide direct archi tectural support for these kernel functions, most applications need to implement these in software and suffer performance bottleneck. Although the advancement of RISC and CISC have made significant improvement on general purpose data computation through their built-in architectural support, all document applications can only be incremental improved through linear increase of the system clock speed. Further, The present invention is characterized by the fact that all compound document data types are converted to an optimized internal file format, wherein the entire internal data path is built around this internal format to gain maximum throughput.

The present invention pertains to a plurality of integrated circuit design methods based on the novel system architecture concept of Document-Instruction-Set-Computing (DISC). It also provide an universal microprocessor integrated circuit for the operation and inter-operation of all desktop and hand-held systems for compound document computing which include, but not limit to, personal communication devices, copier, printer, scanner, pager, scanner, digital TV, videophone, and multimedia retrieval. It is further designed in mind the evolution and planning for a plurality generations of these DISC microprocessors.

The present invention is comprised of a plurality of functional units which independently execute the tasks of: remote communication, session management, and operating system kernel (PACK 218, RX 220, TX 222), run-time bandwidth conditioning and adaptation (BAND 228), application, network, and user run-time priority management (OIF 224), compound document data type management (PACK 218), universal document encoding and decoding (ENC 208, DEC 206), There is also a scalable formatter element (FORM 210) connected to the functional units which inter-operate arbitrary external document formats and intelligently adapt and select internal format corresponding to the system throughput and configuration. Additionally, there is a object smart memory element (SMART 212) connected to the functional units via scalable formatter (FORM 210), which access, store, and transfer blocks of document data based on the selective internal format, and perform compound document query, retrieval, and interpretation. The SMART 212 further access personal knowledge database (PDB 226) via OIF 224 and acquire run-time requirement from application, user, and/or network regarding specific priority list and subject of interest. The SMART 212 then issue high level procedure calls for directing document data retrieval (REF 216) or document data manipulation (EVAL 214). In the preferred client-server computing embodiment, while the functional units are preforming foreground execution of the DISC 112 application programs, the PACK 218, TX 222, and RX 220 are simultaneously performing background execution of the session control, remote communication, and operating system kernel protocols. Alternatively, the integrated circuit can further be comprised of motion-video-capable preprocessing circuit for (PREP 202), postprocessor (POST 204), encoder (ENC 208) and decoder (DEC 206) to perform motion video based compound document script. Furthermore, traditional RISC or CISC co-processor can be built-in or interfaced in order to perform data computation tasks.

To name a few, our present invention provides the following advantages:

a. It provide the architectural properties to support wide range of document-intensive system application. it also provides a universal microprocessor which can provide optimum performance to operate or inter-operate these desktop, handheld, or embedded systems application, particularly in a distributed client-server computing environment. It can further provide internal formatting and smart memory allocation for scalable performance.

b. It provides architectural properties to directly support hardware kernel protocol functions for client-server based operating system, session control, and remote communication, As a result, it directly run in DOS, WINDOW, NT, OS2, UNIX, or other mechanically equivalent operating system environments. It also directly support OSI, TCP/IP, ATM, ISDN or other mechanically equivalent communication protocols, and NetBIOS, LAN Manager, Netware, VINE or other mechanically equivalent network operating systems and session control protocols.

c. It provides architectural properties to perform run-time bandwidth management and to conform with run-time user, network, and application-specific priority requirements.

c. It provides architectural properties to query, retrieve, and interpret document script, and to compile and produce high level language procedural modules conforming to run-time user, application, and network's subject of interest.

d. It provides architectural properties to produce direct executable high level procedures or instruction for referencing or manipulation of the compound document script, it further provide procedure-look-ahead and bit-map pointer stack techniques to maintain pipeline coherence, and apply group fetch, superscalar, and superpipeline to further enhance system performance.

e. Although it is equally capable of data computation task, in consideration of its lesser performance comparing with CISC and RISC, we provide the alternative to integrate or interface with traditional RISC and CISC circuit as functional coprocessors. Consequently, it can conveniently execute traditional DOS, UNIX, and WINDOW applications.

While our above description contains many specifications, these should not be constructed as limitations on the scope of the invention, but rather as an exemplification of one preferred embodiment thereof. Many other variations are possible. For example, a single chip implementation may further contains other still image processing circuits, or a parallel processor implementation can be provided to a ultra-high performance supercomputing server system. Furthermore, many exotic, untested embodiments and minor variations can be provided to further improve the processing speed for ENC 208, DEC 206, PACK 218, TX 222, RX 220, EVAL 214, REF 216, SMART 212, FORM 210. However, our intention has always been in the design of a low cost and yet upgradable integrated circuit solution for massive enterprise, consumer, communications, and desktop, handheld or embedded computing applications, and with the combination use of the method from our present invention, we have achieved integrated circuit chip of practical size and with sufficient speed and accuracy.

Accordingly, the scope of the invention should be determined not by the embodiment(s) illustrated, but by the appended claims and their legal claims.

What is claimed is:

1. An improved data processor system for executing hierarchical high level language procedure calls, using pointers and stacks to represent run time execution of the high level language procedure calls by evaluating and manipulating said pointers and stacks, said system comprising:

means for producing said high level language procedures calls;

means for providing the run-time execution of said high level language procedure calls; and time measurement means for estimating worst case run-time dulration required for executing an entire or a selective portion of said high level language procedure calls during the run-time.

2. An improved data processor system in accordance with claim 1, wherein said time measurement means further comprising means for a compiler, prior to the run-time, for estimating worst case run-time duration required for executing an entire or a selective portion of said high level language procedure calls.

3. An improved data processor system in accordance with claim 1, said system further including stack means for providing the run-time execution at said high level language procedure calls; said stack means comprising top of stack means connected to said time measurement means for estinmating worst case time duration required for executing remainder portion of a corresponding procedure as referenced by a pointer stored in said top of said stack.

4. An improved data processor system in accordance with claim 1, said system further including means for looking ahead and preparing next stack operation when approaching end of said worst case time duration, wherein execution of said high level language procedure call is close to finishing.

5. An improved data processor system in accordance with claim 1, said system further including scheduler means for looking ahead and preparing for terminating present high level language procedure call and setting up forthcoming high level language procedure calls.

6. An improved data processor system in accordance with claim 1, said system further including scheduler means for looking ahead and preparing for setting up forthcoming high level language procedure calls; said scheduler means further examining said forthcoming high level language procedure calls and estimating said worst case time duration required to finish said forthcoming high level language procedure calls.

7. An improved data processor system in accordance with claim 1, said system further comprising interface means for receiving and producing said high level language procedures calls from external program, protocol, work flow, transaction, operating system, and/or database management/retrieval program.

8. An improved data processor system in accordance with claim 1, said system further comprising interface means for producing said high level language procedures calls for executing, manipulating, or processing of external document, task, transaction, program, protocol, work flow, transaction, operating system, and/or database management/retrieval program.

9. An improved data processor for efficient compilation, linikage, processing, and management of a single or plurality hierarchy of high level language procedure calls using evaluation and manipulation of pointers and stack; said system comprising:

first means for a compiler to partition an apllication/program specification into a single or plurality hierarchy of independent executable modules; said first means further partitions each of said modules to single or plurality of executable sub-modules; and second means for time measurement means for estimating worst case run-time duration required for executing an entire or a selective portion of said high level language procedure calls.

10. An improved data processor system in accordance with claim 9, wherein said second means for time measurement means further including means for allowing a compiler, prior to the run-time, to estimate worst case run-time duration required for executing an entire or a selective portion of said high level language procedure calls.

11. An improved data processor system in accordance with claim 9, wherein said second means for time measurement means further including means for allowing an operating system, an application/user interface, or a browser, during the run-time, to moderate change of said run-time environment, and to further estimate worst case run-time duration required for executing an entire or a selective portion of said high level language procedure calls which caused by said change of run-time enviroment.

12. An improved data processor system in accordance with claim 8, said data processing system further including, a third means for facilitating run-time execution of said high level language procedures; wherein said third means produces corresponding call pointer data structure for each of said modules or said sub-modules; said call pointer data structure comprising a procedure call stack and operand call stack; said procedure call stack including a sequence of next procedure pointer address which correspond with next normal or regular execution steps for each of said modules; said operand call stack inclluding a sequence of next data pointer address which correspond with local variable scope for each of said modules.

13. An improved data processor system in accordance with claim 12, said data processing system further including a fourth means for facilitating run-time execution of said high level language procedures; wherein said fourth means produces a corresponding return pointer data structure for each of said modules or said sub-modules; said return pointer data structure including a procedure return stack and operand return stack; said procedure return stack comprising a sequence of previous or alternative procedure pointer address which correspond with conditional or exceptional execution steps for each of said modules, said operand return stack comprising a sequence of previous or alternative data pointers which correspond with local variables scope for each of said modules.

14. An improved data processor system in accordance with claim 8, said data processing system further including a fifth means for facilitating run-time execution of said high level language procedures; wherein said fifth means produce a corresponding auxiliary pointer data structure for each of said modules or said sub-modules, said auxiliary pointer data structure comprising single or plurality of auxiliary procedure stacks and a single or plurality of auxiliary operand stacks; said auxiliary procedure stack including a plurality sequence of previous or subsequent procedure pointer; said auxiliary operand stack comprising a plurality sequence of next, previous or alternative data pointers which correspond with local variables scope for call destination modules.

15. An improved data processor system in accordance with claim 8, said data processing system further including a sixth means for facilitating run-time execution of said high level language procedures; wherein said sixth means produces a logic or storage means for monitoring execution of each of said modules or said sub-modules, said logic or storage determining an appropriate set of procedure pointer and data pointer for maititaining pipeline coherence.

16. An improved data processor system in accordance with claim 8, said data processing system further including a seventh means for facilitating run-time execution of said high level language procedures; wherein said seventh means produces a corresponding bit mapping logic for monitoring execution of each of said modules or said sub-modules, said bit mapping logic determining all appropriate set of procedure pointer and data pointer for maintaining pipeline coherence.

17. An improved data processor system in accordance with claim 16, said bit mapping logic in said seventh means comprising means for predicting/foreseeing which looking-ahead, monitoring whether forthcoming exceptional or conditional steps are arriving or changing of activation record is required; wherein when said means for predicting/foreseeing determines that the forthcoming exceptional or conditional steps are arriving or changing of activation record is required, said bit mapping logic then prefetching procedural and/or data pointers for maintaining pipeline coherence.

18. An improved system utility, using pointers and stacks for representing document as a high level language procedure calls, and processing said document according to sequential or parallel manipulation of said high level language procedure calls, said system comprising:

input means for receiving external documents, said input means converting said document to selective internal format;

oroanizer means for selecting an appropriate hierarchy of logical orders for each of said documents, wherein said hierarchy of logical order can be chapter, section, and paragraphs; said organizer means further partitioning each of said document into a plurality of logical partitions according to said selected hierarchy of logical orders; and procedure means, coupled to said organizer means, for producing a hierarchical procedure framework for each of said document, wherein a logical partition corresponds with document content of a particular logical order, and a companion procedure is assigned to each of said logical partition; wherein manipulation of said document is performed through executing of said hierarchical procedure framework.

19. An improved system utility in accordance with claim 18, said system further including time measurement means for estimating worst case rum-time duration required for executing an entire or a selective portion of said high level language procedure calls during the run-time.

20. An improved system utility in accordance with claim 18, said system further including means for producing high level language procedure calls performing program control functions for a hierarchical procedure framework including computer program, database program, work-flow program, object-oriented program; transaction processing program, operating system program, user interface program, browser program, or communications protocol.

21. An improved system utility in accordance with claim 18, said system further including procedure stack means for establishing a hierarchical order according to said selected logical order, wherein higher hierarchy represents broader logical order, lower hierarchies represent more detailed logical order.

22. An improved system utility in accordance with claim 21, wherein said procedure stack means further comprising selective plurality of operators, wherein a push operator move from higher to lower hierarchy, a pop operator move from lower to higher hierarchy.

23. An improved system utility in accordance with claim 18, said system further including evaluation stack for representing sequential steps of evaluation, processing, and/or manipulation of each of said logical partition in the stack.

24. An improved system utility in accordance with claim 18, said system further including interface means for selecting subject of interest from user or application.

25. An improved system utility in accordance with claim 18, said system further including search engine means for comparing, correlating, or interpreting said subject of interest with concept, theme, keyword, or topic of document content of each said logical partition, said search engine means identify selective plurality of logical partitions with corresponding document contents relevant to said subject of interest.

26. An improved system utility in accordance with claim 25, said search engine means can be performed by human, hardware, software or firmware resources.

27. An improved system utility in accordance with claim 18, said system further including procedure pointer means for assigning a pair of entry and exit pointers for each of said hierarchical procedure framework, said entry and exit pointers provides entry and exit address locations for the document content for each of said logical partition.

28. An improved system utility in accordance with claim 27, said system further including browsing means for selectively choosing from plurality of said entry and exit pointers of said procedure pointers means and organizing the pointers in a sequential order, said browsing means further allowing user or application to review selective document content or a particular subject of interest from one logical partition to another according to said sequential order of the pointers.

29. An improved system utility in accordance with claim 18, said system further producing said high level language procedures calls for executing, manipulating, or processing of external input other than document such as task, transaction, program, protocol, work flow, transaction, operating system, and/or database management/retrieval program.

30. An improved system utility, in accordance with claim 18, using pointers and stacks for representing subject of interest from selective plurality of user or application, wherein selecting subjects of interest by finding relevant document content, and referring them said subject of interest as a procedure scope for the corresponding logical partition, said system comprising:

input means for receiving a list of subject of interest from a selective plurality of user or application;

search engine means for comparing, correlating, and/or interpreting said list of subject of interest with concept, theme, keyword, or topic of document content of each said logical partition, provided said search engine means identifying selective plurality of logical partitions with corresponding document contents relevant to said subject of interest; and scoping means for creating a procedure scope for each corresponding procedure of said logical partition, said procedure scope comprises a selective plurality of local variables, global variables, and/or parameters.

31. An improved system utility, in accordance with claim 30, wherein each of said local variable represent an individual subject of interest for a particular user or application which have found relevancy within document content of said logical partition.

32. An improved system utility, in accordance with claim 30, wherein each of said global variable representing a common subject of interest for a selective plurality of said user or application which have found relevancy within document content of said document partition.

33. An improved system utility, in accordance with claim 30, wherein each of said parameter representing procedure pointers to selective one of plurality of remaining logical partitions which contain same subject of interest.

34. An improved system utility, in accordance with claim 30, said system further including activation means for continuously maintaining a record of currently active user/application and said active user/application's subject of interests, said activation means further continuously updating procedure scope for each of said companion procedure assigned to the logical partitions wherein local/global variable and parameter within said procedure scope can be updated according to subject of interest for those currently active user/application.

35. An improved system utility using pointers and stacks for prediction and managing flow control of forthcoming sequence of normal and exceptional run-time execution of a high level language procedure call, in order to manipulate selective logical partitions with document content relevant to subject of interest for a selective one or plurality of active user or application, said system comprising:

predictor means for looking ahead of execution and determining whether forthcoming execution is a normal operation or an exceptional operation;

look-ahead address pointer preparation means connected to said prediction means for preparing address pointers for said forthcoming exceptional/abnormal operation in order to maintain continuous execution:
  (i) call stack means comprising a list of address pointers for next instruction under normal operation, wherein address preparation is not required since document will continue to be browsed or reviewed unit by unit, wherein next address pointer is achieved by incrementing one unit from a current address location;
  (ii) return stack means comprising a list of address pointer for next instruction under abnormal/exception operation, wherein address preparation is required since document will not continue to be browsed in the same logical partition, wherein the address pointer for the next instruction can not be simply achieved by incrementing one unit from a current address location, unless forthcoming pointer can be identified prior to said forthcoming pointer execution time, and execution will be halted until address preparation is performed.

36. An improved system utility using pointers and stacks in accordance with claim 35, said system further including time measurement means for estimating worst case run-time duration required for executing an entire or a selective portion of said high level language procedure calls during the run-time.

37. An improved system utility using pointers and stacks in accordance with clam 35, said system including comparator means for continuously comparing current address location with the exit address pointer representing end of document content for said logical partition, wherein a significant difference shows next operation is a normal operation, and a insignificant difference shows operation is approaching end of said logical partition, exceptional operation will arise and address preparation is required.

38. An improved system utility using pointers and stacks in accordance with claim 35, said system further including look-ahead parameter pointer preparation means for looking-up, evaluating, and determining a parameter or another address pointer for a next logical partition which contains document content with the same subject of interest.

39. An improved system utility using pointers and stacks in accordance with claim 35, said predictor means for looking ahead of execution and determining whether forthcoming execution is a normal operation, wherein the normal operation occurs most of the time, wherein said system continue browsing and reviewing document content within same logical partition, and continue executing next instruction within same procedure.

40. An improved system utility using pointers and stacks in accordance with claim 39, said system further including incrementor means for continuously incrementing current address pointer by one unit and use the address pointer as address pointer for a next normal operation, said means further storing said next address pointers in said call stack for facilitating continuous execution.

41. An improved system utility using pointers and stacks in accordance with claim 35, said predictor means for looking ahead of execution and determining whether forthcoming execution is an exceptional operation, wherein exceptional/abnormal operation occurs occasionally, wherein said system complete browsing the document content within a same logical partition and requiring to enter to a next logical partition or return to a selective one of plurality of previous logical partitions, wherein the system will need to enter to a next procedure or return to a selective one of plurality of the previous procedure in order to continue execution.

42. An improved system utility using pointers and stacks in accordance with claim 41, said system further including return stack preparation means, connected to said look-ahead address pointer preparation means for continuously looking ahead and identifying forthcoming operations require entrance to a next or a previous logical partition, and preparing or assembling a list of address pointer in said return stack, in preparation for said forthcoming operations.

43. An improved system utility, using pointers and stacks for direct execution of hierarchical high level language procedures in order to manipulate selective logical partitions with document content relevant to the subject of interest for a selective one or plurality of active user or application; comprising:

operation means for preparing a program sequence for each evaluation, manipulation, and processing operation of the document content of each of the logical partition;

time measurement means for estimating worst case time duration required for executing an entire or a selective portion of said high level language procedure calls;

system look up table (SLUT) means for providing a program storage for all of said program sequence for evaluation, manipulation, and processing operation of the document content of each of the logical partition;

pointer preparation means for producing a address pointer including index, attribute, identifier, or descriptor, for referring to each of said evaluation, processing, or manipulation operation of the document content of each of the logical partition; and stack preparation means connected to said pointer preparation means for providing program control stack and data stack framework for run time execution of said each logical partition, said stack preparation means preparing said pointers according to run time execution order of evaluation, manipulation, and processing of said document content.

44. An improved system utility in accordance with claim 43, said system further including procedure preparation means for producing the hierarchial procedure framework for each document, wherein each of said hierarchial procedure framework enclosing said program control stack and said data stack for evaluation, manipulation, and processing of said document content of said each logical partition.

45. An improved system utility in accordance with claim 43, said system further including run-time direct execution means for executing each of said logical partition within a document according to said program control stack and said data stack, said run-time direct execution means further referring to said address pointer for each step of evaluation, processing, or manipulation, and directly fetching the program sequence stored within said system-look-up-table.

46. An improved system utility, using pointers and stacks for prediction of change of run time environment including active user or application, continuously executing subject of interest, and processing selective logical partitions within a document containing said subject of interest, said system comprising:
  environment bit map means for storing current status of a run time environment in a bit map, wherein said run time environment provides a current updated list of active user, application, and/or communication bandwidth;
  environment bit map stack means for sensitizing change of said run time environment including user, application, and/or communication bandwidth, said environment bit map stack means continuously registering and storing a present run time environment status at top of said environment bit map stack, said environment bit map stack means further pushing previous run time environment status into a next lower level of said bit map stack, comparing and determining any difference between content stored at top of said bit map stack and content stored at lower level of said bit map stack;
  subject bit map means connected to said environment bit map stack means for representing and updating a list of subject of interest of currently active user and applications in a bit map; and
  subject bit map stack means connected to said subject bit map means for continuously updating, the list of subject of interest, and storing current the list of subject of interest at top of said subject bit map stack, said subject bit map stack means further comparing said current list with previous list for identifying a list of new subject of interest, which is caused by change of active user or application.

47. An improved system utility, in accordance with claim 46, wherein said bit map and/or said stack can be extended to other logic or storage means.

48. An improved system utility, in accordance with claim 46, said system further including prediction means connected to said subject bit map stack means for collecting said list of new subject of interest, and proceeding with evaluation and identification of the selective logical partitions with content relevant to said subject of interest.

49. An improved system utility, in accordance with claim 48, said system further including a search engine in said prediction means for collecting said list of new subject of interest, and proceeding with evaluation and identification of file selective logical partitions with content relevant to said subject of interest.

50. An improved system utility, in accordance with claim 46, said system further including procedure frame means connected to said prediction means for preparing a procedure framework for forthcoming run time execution.

51. An improved system utility, in accordance with claim 50, said procedure frame means further including object stack means for selecting global variables, local variables, and parameters for each of said logical partition.

52. An improved system utility, in accordance with claim 51, wherein said global variable representing common interest and/or said local variable representing individual interest.

53. An improved system utility, in accordance with claim 50, said procedure frame means further including evaluation stack for selecting sequential computation or evaluation steps required for each of said logical partition.

54. An improved system utility, in accordance with claim 53, said system further including procedure stack means connected to said procedure frame means for producing a sequence of browsing operation for reviewing the selective logical partitions containing relevant subject of interest.

55. An improved system utility, in accordance with claim 54, said system further including means connecting said procedure stack means with a browser, an operating system, or a user application interface program, wherein said procedure stack means connected to said procedure frame means for producing a sequence of browsing operation for reviewing the selective logical partitions containing relevant subject of interest.

56. An improved system utility, in accordance with claim 54, said system further including exception handling means connected to said procedure stack means and said evaluation stack means for identifying exception/abnormal operations which requires an exit from current procedure and an entrance to another prosedure.

57. An improved system utility, in accordance with claim 56, said system further including return stack means connected to said exception handling means for looking ahead, and preparing a list of address pointers for the forthcoming procedure entry locations.

58. An improved system utility, in accordance with claim 57, said return stack means further connected to an evaluation stack for monitoring evaluation steps when current procedure approaching end of operation, and having a next procedure entry pointer ready at top of said return stack means, wherein system continue with next procedure without further delay for address preparation.

59. An improved system utility, in accordance with claim 58, said return stack means further connected to a time measurement means for estimating worst case run-time duration required for executing an entire or a selective portion of said high level language procedure calls during the run-time; said return stack further connected to an evaluation stack for monitoring evaluation steps when current procedure approaching end of operation, and having a next procedure entery pointer ready at top of said return stack means, wherein system continue with next procedure without further delay for address preparation.

60. An improved data processor for providing pointers and stacks for remote execution of high level language procedural calls, said system comprising:
  a server or a host system means, where a plurality of applications are stored as high level language procedures, said server means provides pointers and stacks data structure for facilitating run-time execution of said high level language procedures;
  a plurality of user or client terminal means;
  a networking means for connecting said server and said client terminals;

means for receiving request for the application from said client terminal;

scheduler means for determining a selective set of procedures in said application to be performed on said client terminal means, and time measurement means for estimating worst case time duration required for executing an entire or a selective portion of said high level language procedure calls.

61. An improved data processor in accordance with claim 60, for providing pointers and stacks for remote execution of high level language procedural calls, wherein said time measurement means further coupled to said scheduler means for monitoring progress of executing each of said procedure.

62. An improved data processor in accordance with claim 61, for providing pointers and stacks for remote execution of high level language procedural calls; wherein remaining portion of said application is to be performed at said server or said client, said time measurement means further alerting said client and/or said server scheduler means for further preparing corresponding stacks and pointers data structure for said selected set of procedures.

63. An improved data processor in accordance with claim 60, said system further including means for forwarding corresponding pointers and stacks information for said selected procedures to said client terminal means in order to set up run-time execution environment.

64. An improved data processor in accordance with claim 63, said system further including memory map means for communicating/exchanging data, pointer, and/or stack information between said server and said client terminal means, wherein said memory map means select memory locations on said client terminal means and map said memory locations to address space of said server.

65. An improved data processor in accordance with claim 64, said memory map means can be further used for general purpose or special purpose communication and/or exchanging of data, status, and/or program intformation between said server and said client terminal means.

66. An improved data processor in accordance with claim 60, said system further including means in said client for interpreting, simulating, emulating, and/or performing run-time execution of said selected procedures according to said corresponding pointers and stacks.

67. An improved data processor in accordance with claim 60, said system further including means for forwarding result, argument, or parameters of said selected procedures between said server and said client after completion of said run-time execution.

68. An improved data processor for a distributed or downloadable operating system program, providing pointers and stacks for efficient compilation; linkage, processing, and management of corresponding hierarchical high level language procedural calls, said system comprising:

means in a client for performing micro kernel system functions;

means in said client for defining a set of selective hardware and/or software system resources information required to be managed by said client during run-time;

means for communicating said hardware and/or sotftware system resource information to a server; and means in said server for providing operating system programs for said client as in a set of high level language based procedures.

69. An improved data processor in accordance with claim 68, said system further comprising:

means for producing corresponding pointer and stack for each of said high level language procedures for facilitating run-time execution of said operating system program;

means for downloading or transporting said pointer and/or stack data structure through said communication means to said client; and means in said client means for performing run-time execution of said operating system program according to said corresponding pointers and stacks.

70. An improved data processor in accordance with claim 68, said system further comprising time measurement means for estimating worst case time duration required for executing an entire or a selective portion of said high level language procedure calls.

71. An improved data processor in accordance with claim 70, said system further comprising means coupled to said time measurement means for management of time critical system functions including execution and scheduling for a multiplicity of threads, synchronization for a multiplicity of processes, and translation and mapping for high level system objects.

72. An improved data processor in accordance with claim 68, said system further comprising reconfiguration means for updating change of run-time system resources for said clients, said reconfiguration means communicating to said server and preparing a second set of pointer and stack data structure for run-time execution of corresponding operating system program.

73. An improved data processor, in accordance with claim 72, wherein said reconfiguration means further perform a system reset and download said operating system program to said client for continuing the run-time execution of said operating system program.

74. An improved data processor in accordance with claim 68, said system further comprising a browser means for facilitating communications between said server and said client.

75. An improved data processor in accordance with claim 68, said system further comprising an application/user interface means for facilitating communications between said server and said client.

76. An improved data processor for efficient compilation, linkage, processing, and management of corresponding high level language procedural calls, said system comprising:

means for producing a set of high level language procedural calls;

means for providing a run-time execution environment for a current high level language procedure call which is being executed;

time measurement means for estimating worst case time duration required for executing an entire or a selective portion of said high level language procedure call;

real time clock means; wherein said means can be managed by a hardware, software or firmware system resource;

timer means connected to said real time clock means for measuring and monitoring the progress of said current high level language procedure calls during its run-time execution;

look ahead means coupled to said timer means for producing a alert signal when the current high level language procedure call is approaching the end of its run-time execution; and prediction means coupled to said look ahead means for determining a next forthcoming high level language procedure; said means further proceed and prepare the run-time environment for said forthcoming high level language procedure prior to its run-time execution.

77. An improved data processor for an operating system program, providing pointers and stacks for efficient compilation, linkage, processing, and management of hierarchical high level language procedural calls, said system comprising:

- means performing system functions;
- means in said system for defining a set of selective internal and/or external hardware and/or software system resources required to be managed by said system;
- means for communicating said hardware and/or software system resource information to said system;
- means in said system for providing operating system programs as in a set of high level language based procedures;
- means in said system for performing run-time execution of said operating system programed according to said high level language based procedures;
- real time clock means; and
- time measurement means coupled to said real time clock means for estimating worst case time duration required for executing an entire or a selective portion of said high level language procedure calls.

78. An improved data processor in accordance with claim 77, said system further including means for performing micro kernel system functions for said operating system program.

79. An improved data processor in accordance with claim 77, said system further including means for producing corresponding pointer and stack for facilitating run-time execution of said high level language based procedures for said operating system program.

80. An improved data processor in accordance with claim 79, said system further including means in said system for performing run-time execution of said operating system program according to said corresponding pointers and stacks.

81. An improved data processor, further providing pointers and stacks for providing a downloadable communications protocol program for efficient compilation, linkage, processing, and management of hierarchical high level language procedural calls, said system comprising:

- a library comprising single or plurality communications means, wherein each of said communications means defines a multiple layered of communications protocol program;
- a network of transmitting and receiving system means, wherein each of said transmitting and receiving system means comprises means for selecting one of said plurality of communications means,
- means for representing each of said communications protocol programs in one of said communications means as a set of high level language procedures;
- means for constructing a protocol stack, wherein each level of said stack corresponding to a particular layer of said communications protocol, and each level of said stack stores a pointer directing to the corresponding high level language procedures;
- means for downloading or transporting said pointers and stack information to said transmitting and receiving system means;
- means in said transmitting and receiving system means for performing run-time execution of said communications protocol program according to said corresponding pointers and stacks; and
- means in said transmitting and receiving system for executing said communications protocols for transmitting and/or receiving program or data information.

82. An improved data processor, in accordance with claim 81, said system further including time measurement means for estimating worst case time duration required for executing an entire or a selective portion of said high level language procedure calls.

83. An improved data processor, in accordance with claim 81, said system further including means for providing pointers and stacks for the corresponding high level language procedures.

84. An improved data processor, in accordance with claim 81, said system further including means for performing run-time execution of said communications protocol program according to said corresponding pointers and stacks for facilitating the run-time execution of said communications protocol.

85. An improved data processor for providing pointers and stacks as in software data structure, comprising:

- storage means having a memory array or a register array function as stack;
- means for allocating a selective plurality of locations in said stack of said storage means, wherein each of said locations represents a level of said stack, and corresponding pointer information for each level of said stack is stored in each of said storage location;
- means for assigning one of said storage locations as top of said stack;
- indexing means for providing a push or a pop operation for said stack;
- means for writing pointer information into said storage locations for said stack;
- means for reading pointer information from said storage locactions for said stack; and
- means for detecting overflow or underflow of the pointer information in said stack.

86. An improved data processor, in accordance with claim 85, said system further including time measurement means for estimating worst case time duration required for executing an entire or a selective portion of said high level language procedure calls.

87. An improved data processor, in accordance with claim 86, said system further including a real time clock means coupled to said time measurement means for estimating worst case time duration required for executing an entire or a selective portion of said high level language procedure calls.

88. An improved data processor, in accordance with claim 85, wherein said storage means is not only suitable for the memory array or the register array data structure, it can further be extended to file or database.

89. An improved data processor, in accordance with claim 85, wherein said indexing means for providing a push or a pop operation for said stack, wherein a push operation is performed by decrementing said storage address by one unit from said storage location representing said top of said stack, a pop operation is performed by incrementing said storage address by one unit from said storage location representing said top of said stack.

90. An improved data processor, further providing time management for the pointers and stacks, said system comprising:

- time measurement means for estimating worst case time duration required for executing an entire or a selective portion of a high level language procedure calls;
- top of stack means connected to said time measurement means for estimating worst case time duration required for executing remainder portion of a corresponding procedure as referenced by a pointer stored in said top of said stack;

means for looking ahead and preparing next stack operation when approaching end of said worst case time duration, wherein execution of said high level language procedure call is close to finishing, and scheduler means for looking ahead and preparing for terminating present high level language procedure calls and setting up forthcoming high level language procedure calls, said scheduler means further examining said forthcoming high level language procedure calls and estimating said worst case time duration required to finish said forthcoming high level language procedure calls.

* * * * *